(12) United States Patent
Kaufman et al.

(10) Patent No.: US 11,598,398 B2
(45) Date of Patent: Mar. 7, 2023

(54) MECHANICAL CONVERTER FOR CONVERTING ROTARY MOTION TO RECIPROCATING MOTION

(71) Applicants: Lev Kaufman, Newton, MA (US); Solomon Kaufman, St. Petersburg (RU)

(72) Inventors: Lev Kaufman, Newton, MA (US); Solomon Kaufman, St. Petersburg (RU)

(*) Notice: Subject to any disclaimer, the term of this patent is extended or adjusted under 35 U.S.C. 154(b) by 0 days.

(21) Appl. No.: 16/945,524

(22) Filed: Jul. 31, 2020

(65) Prior Publication Data

US 2021/0033175 A1    Feb. 4, 2021

Related U.S. Application Data

(60) Provisional application No. 62/881,198, filed on Jul. 31, 2019.

(51) Int. Cl.
| | | |
|---|---|---|
| *F16H 19/04* | (2006.01) | |
| *F16H 37/06* | (2006.01) | |
| *F16H 55/26* | (2006.01) | |
| *F16H 55/17* | (2006.01) | |

(52) U.S. Cl.
CPC ......... *F16H 19/043* (2013.01); *F16H 37/065* (2013.01); *F16H 55/17* (2013.01); *F16H 55/26* (2013.01)

(58) Field of Classification Search
CPC ....... F16H 19/043; F16H 37/065; F16H 55/26
See application file for complete search history.

(56) References Cited

U.S. PATENT DOCUMENTS

| | | | | | |
|---|---|---|---|---|---|
| 77,464 | A | * | 5/1868 | Davis ..................... | F16H 19/043 74/30 |
| 566,198 | A | * | 8/1896 | Livoni .................. | F16H 19/043 74/582 |
| 1,271,569 | A | * | 7/1918 | Hancock ............... | F16H 19/043 92/136 |
| 2,470,246 | A | * | 5/1949 | Heisman ............... | F16H 19/043 74/32 |
| 2011/0138939 | A1 | * | 6/2011 | Carr ...................... | F16H 19/043 74/32 |
| 2012/0291572 | A1 | * | 11/2012 | Baker ................... | F16H 19/043 74/32 |
| 2017/0037948 | A1 | * | 2/2017 | Tseng ...................... | F16H 37/16 |
| 2020/0158240 | A1 | * | 5/2020 | Peguero .................. | F02B 75/28 |
| 2021/0018076 | A1 | * | 1/2021 | Voegeli ................... | F02B 75/24 |

* cited by examiner

*Primary Examiner* — Terence Boes

(57) ABSTRACT

A mechanical converter for converting rotary motion to reciprocating motion, and vice versa, featuring a gear rack, one or more half-gears alternately engaged with the gear rack, the gear rack configured to produce reciprocating motion in response to the alternate engagement with the one or more half-gears.

17 Claims, 28 Drawing Sheets

US 11,598,398 B2

MECHANICAL CONVERTER FOR CONVERTING ROTARY MOTION TO RECIPROCATING MOTION

PRIORITY CLAIM

This application claims the benefit of and priority to U.S. provisional application 62/881,198. The referenced application incorporated herein as if restated in full.

FIELD OF INVENTION

The invention refers to the field of mechanical engineering, more particularly, to converters of a reciprocating motion into a rotary motion and vice versa. The invention can be used in reciprocating engines, pumps, machine tools and other devices.

BACKGROUND

A known motion converter based on a slider-crank mechanism is widely used in most Internal Combustion Engines (ICEs) [1]. The disadvantages of this converter (analogue) are reduced reliability and low efficiency.

Reliability of the analogue is reduced due to the mismatch of two vector directions: the piston pressure force vector and the crankshaft rotation force vector, to which the piston force is transmitted. This mismatch causes piston skewing and an increased piston and cylinder wear.

Low efficiency is determined by the fact that the magnitude of the piston pressure force, transmitted to the rotation of the crankshaft depends on the angle of rotation of the crankshaft.

With a slight error, ignoring the angle of deviation of the connecting rod from the line of the piston motion, we can assume that the dependence of the magnitude of the crankshaft rotation force (Fc) on the piston pressure force (Fp) is a sinusoidal function of the crankshaft rotation angle ($\alpha$): Fc=Fp*sin($\alpha$).

Therefore, in a slider-crank converter, the average value of the piston force, transmitted to the rotation of the crankshaft during the passage of the piston from the top to bottom dead points, is determined by the average value of the sine function of the crankshaft rotation angle from 0 to $\pi$. Since the average value of the sine function is equal to the integral of the sine within the range of the angle from 0 to pi, divided by the length of the segment on which the integral is taken, therefore, the dependence of the average value of the crankshaft rotation force (Fc.ave) on the piston force (Fp) will be:

$$Fc.ave = Fp * (1/\pi) * \int_0^\pi \sin(\alpha)d\alpha$$

Since the value of the sine integral within the angle from 0 to $\pi$ is 2, then Fc.ave=Fp*2/$\pi$.

An ideal converter, unlike a slider-crank converter transfers the power of the piston to the rotation of the wheel completely, regardless of the angle of rotation of the wheel, so Fc.ideal=Fp. Consequently, the force of the piston transmitted to the rotation of the wheel at the ideal converter is $\pi/2$ more than the force transferred to the rotation of the wheel at the slider-crank converter.

Since the efficiency of the converter is proportional to the force transferred to the rotation of the wheel (or crankshaft), the efficiency of the ideal converter is approximately $\pi/2$ times, i.e. more than 1.5 times higher than that of the crank converter.

In addition, as mentioned above, in slider-crank converter the mismatch between piston pressure force vector and the crankshaft rotation force vector causes piston skewing, an excessive friction between the piston and the cylinder and as a result, increased wear of both parts, which also reduces the efficiency of the analogue.

The purpose of the invention is to increase the converter efficiency and improve reliability by minimizing the deviation of the piston motion vector from the line tangent to the circumference of the wheel.

SUMMARY

The most suitable solution for the intended purpose is the use of the transmission in the form of a clutch of a gear wheel and a gear rack.

The efficiency of the gear train is known to be high (about 97-98%) and approaches the efficiency of the ideal converter. But using a regular gear wheel and gear rack can not provide the conversion of the reciprocating motion into unidirectional rotational motion.

The use of a half-gear enables a converter to overcome this limitation. A half-gear is a gear wheel in which the teeth are present only on half the circumference.

Different combinations and configurations of gear racks and half-gears as well using a usual gear wheels allow creation of a variety of implementations of mechanical or gear converters of reciprocating motion into rotary motion and vice versa for different purposes.

DETAILED DESCRIPTION

Figure 1:
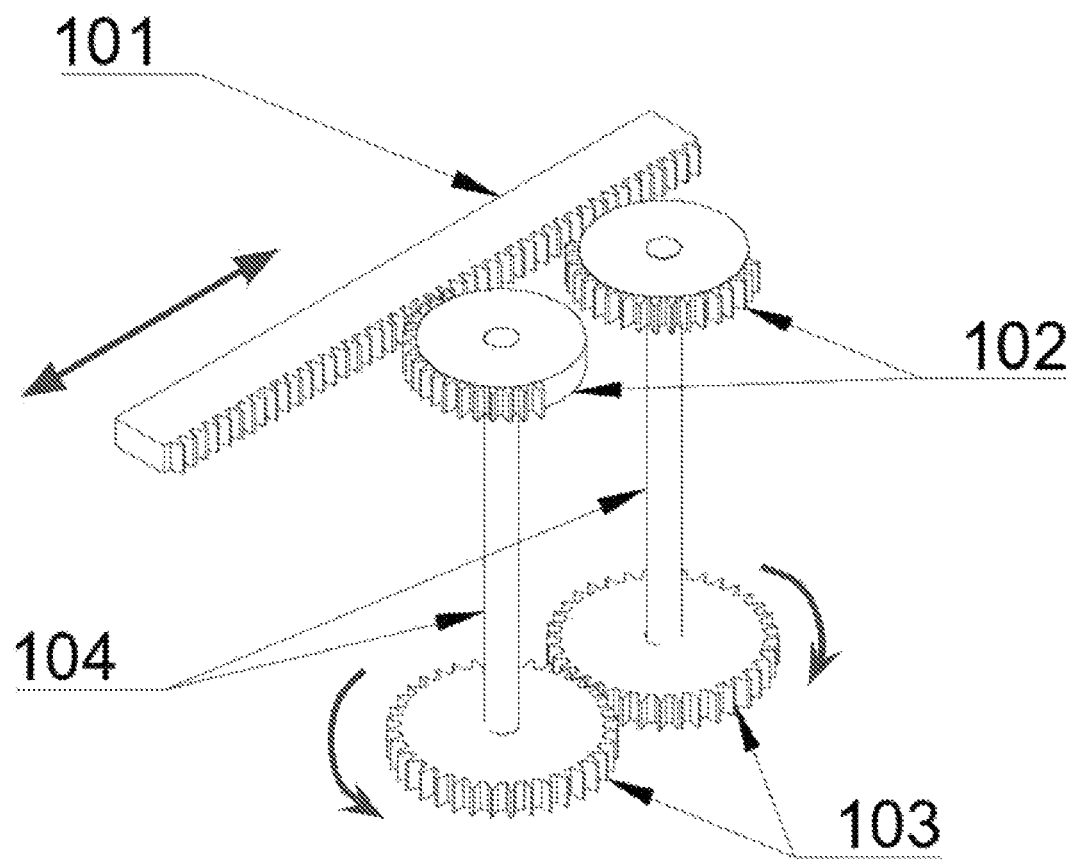
FIG. 1 shows an exemplary mechanical converter for converting reciprocating motion into rotary motion and vice versa, featuring two corresponding gears engaged in opposing rotation.

FIG. 1 shows an implementation of a converter for reciprocating motion into rotary motion and vice versa. The converter consists of a gear rack 101, two half-gears 102 and two corresponding gear wheels 103. The two half-gears have equal diameters and are deployed with a shift 180 degrees from each other such that when they are synchronously rotating in opposite directions, they alternately engage with the gear rack 101—thus only one half-gear 102 engages with the rack 101 at any time and the half-gears are never both engaged with the gear rack simultaneously.

Each half-gear 102 sits on its shaft 104 with its corresponding gear wheel 103. When one half-gear rotates, the corresponding gears 103, equal in diameter and engaged to each other, rotate too. As a result, the second half-gear 102 rotates in an opposite direction. The corresponding gears 103 engaged with each other provide synchronous rotation of the half gears 102 in opposite rotational directions, regardless of the coupling of the half gears 102 with the gear rack 101. If external forces are applied to the gear rack 101, the gear rack can reciprocate along its axis. When the rack 101 moves in one direction, it engages with one half-gear 102, and both half-gears 102 and corresponding gears 103 make one half-turn. When the gear rack 101 moves to the opposite direction, it engages with the second half-gear 102. During the movement of gear rack 101 forward and back, both half-gears 102 and corresponding gears 103 make a full turn. Thus, with the gear rack 101 performs reciprocating motions, the half-gears 102 and the corresponding gears 103 perform a continuous unidirectional rotation. Conversely, if any of the two shafts 104 rotates due to the external rotational force, the gears 103 and the half-gears 102 rotate too. Half-gears 102, are alternately engage with the gear rack 101 and force it to reciprocate.

Figure 2:
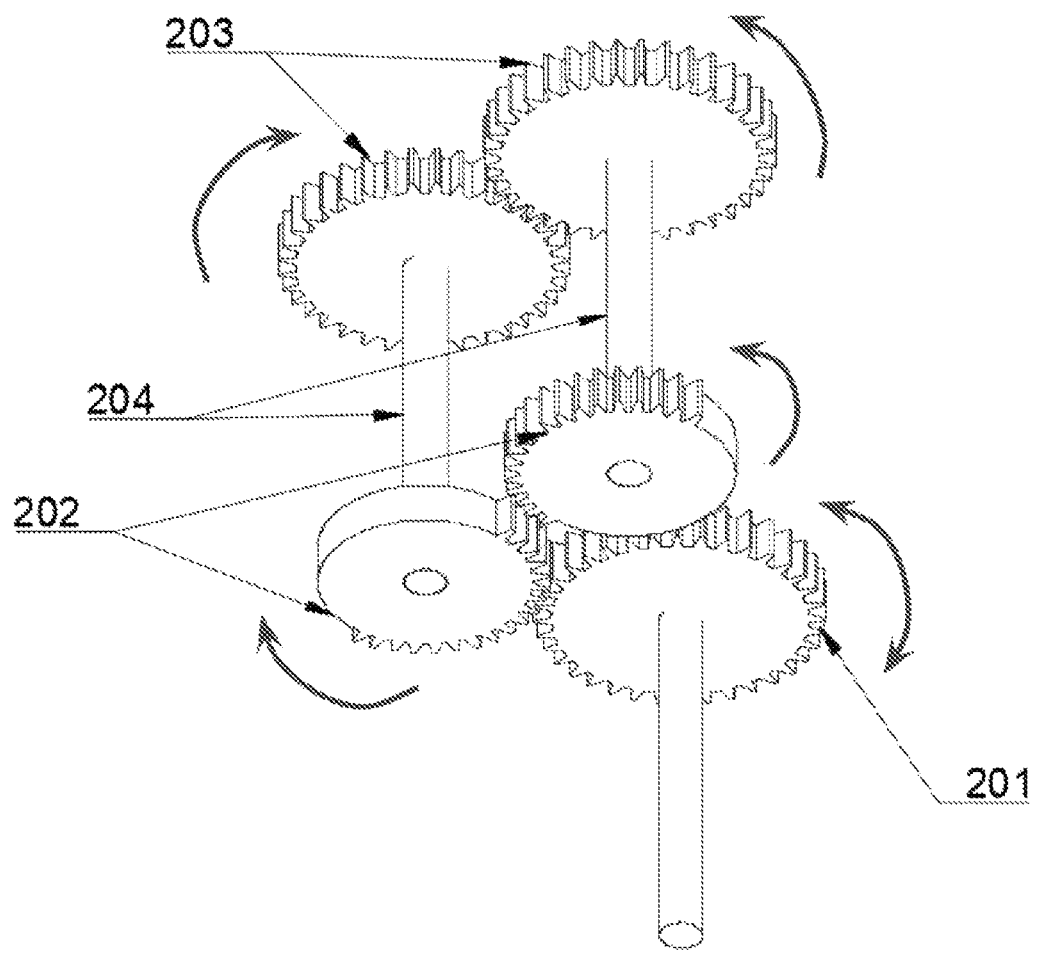
FIG. 2 shows the exemplary mechanical converter with the gear rack having a practical radius.

FIG. 2 shows a converter of reciprocating-rotational motion to the unidirectional rotational motion and vice versa. This converter is built and operates similarly to the converter shown in FIG. 1. In order to implement the conversion of reciprocating-rotational motion, a wheel gear 201, performing reciprocating-rotational motion is introduced instead of gear rack. The half-gears 202 are alternatively engaged with the wheel gear 201.

Two half-gears 202, each coupled to engaged corresponding gears 203 via shafts 204, synchronously rotate in opposite directions and are deployed with a shift nearly 180 degrees from each other such that when they are synchronously rotating in opposite directions, they alternately engage with the wheel gear 201—so only one half-gear 202 engages with the wheel gear 201 at any time and the half-gears are never both engaged with the wheel gear simultaneously. Therefore, half-gears 202 are alternately engaged with the gear 201 and force it to perform a reciprocating-rotational motions.

Figure 3:
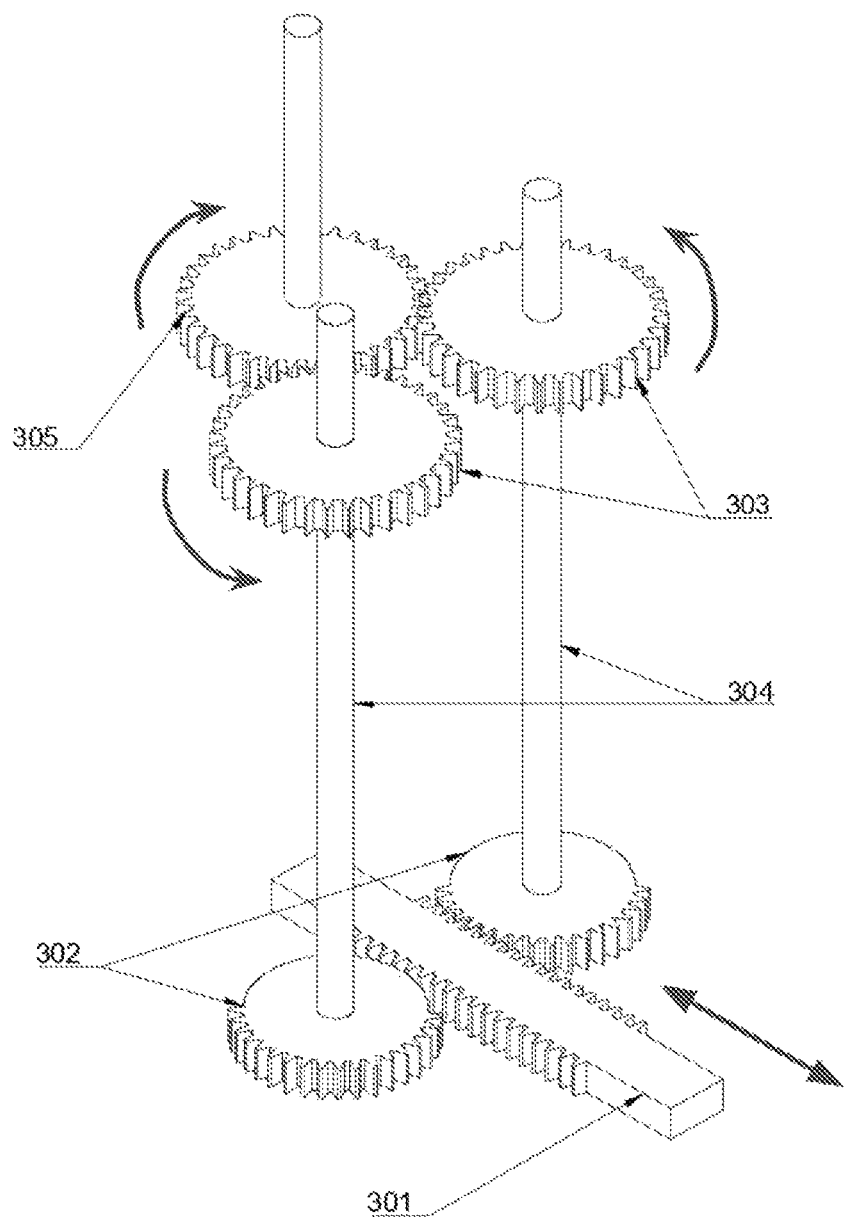
FIG. 3 shows an exemplary mechanical converter featuring two corresponding gears engaged to a shared gear.

FIG. 3 shows a second variant of an implementation of the converter of reciprocating motion into a rotary motion and vice versa in which, in order to reduce the dimensions of the converter, a shorter gear rack 301 with teeth on both sides is introduced. Two half-gears 302 are also located on both sides of the gear rack 301 and are deployed without a shift from each other. With the synchronous rotation of the half-gears 302 in the same direction, only one of them is engaged with the gear rack 301 at any time.

Each half-gear 302 is coupled to a shaft 304 with a corresponding gear wheel 303, and each corresponding gear wheel is coupled to a shared gear wheel 305. When the shared gear wheal rotates, both corresponding gear wheels 303 co-rotate in a direction opposite the shared gear wheel, thereby synchronously rotating the half-gears 302 via the shafts 304. Half-gears 302, when rotating, are alternately engaged with the rack 301 causing it to reciprocate. Similarly but conversely, if, under the influence of external forces, the rack 301 performs a reciprocal movement, then because of its alternate engagement with half-gears 302, the half-gears rotate, thereby causing corresponding gears 303 and shared gear wheel 305 to rotate too. The shared gear wheel 305, which ensures synchronous rotation of gears 303, can be replaced with a flexible toothed belt configured to embrace the corresponding gears 303.

Figure 4:
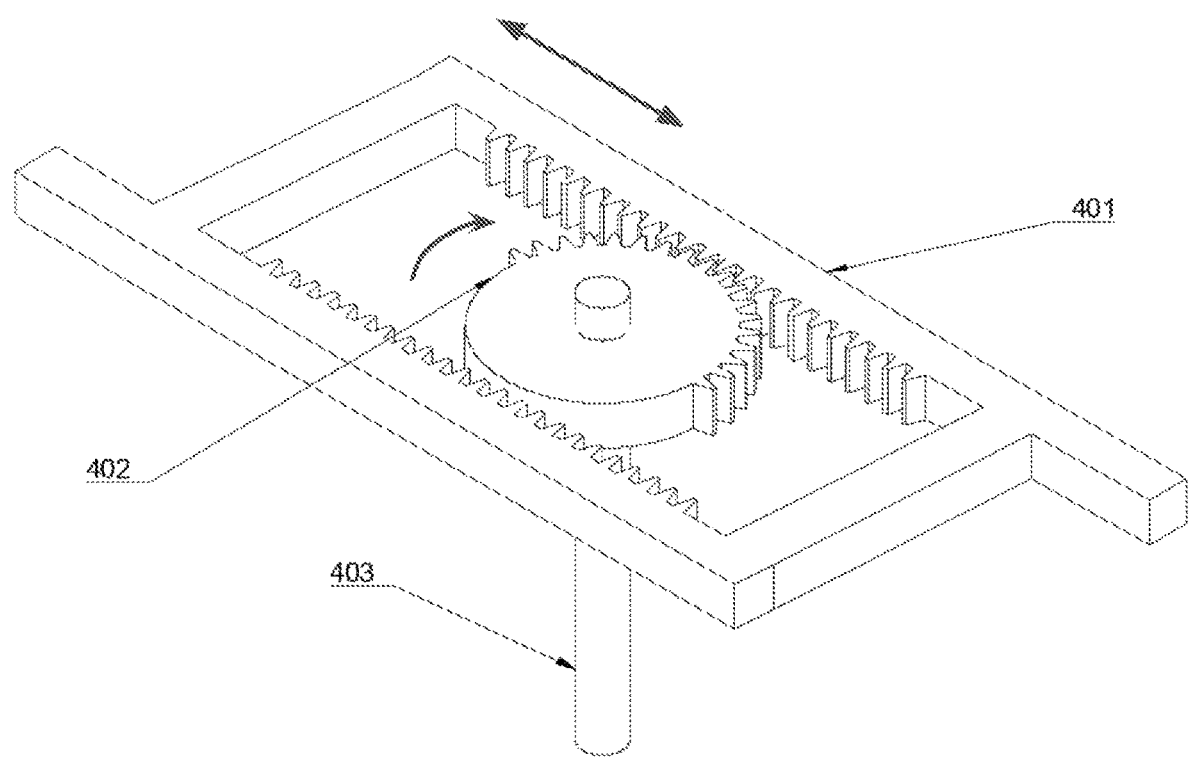
FIG. 4 shows an exemplary mechanical converter with a gear frame.

FIG. 4 shows a third variant of an implementation of the converter of reciprocating motion into a rotary motion and vice versa. In order to simplify the design, a gear (toothed) frame 401 and half-gear 402 are introduced into the converter. The gear frame 401 is made of two parallel gear racks, each disposed on a gear rack bar, which are rigidly interconnected by one or two jumpers. The gear frame 401 comprises two endings which are continuous with the gear rack bars. An external force can be applied to these endings in order to cause the frame 401 to reciprocate along its toothed rack bars axis. The teeth of the toothed racks are disposed on toothed sections located on the inner side of the frame 401. The length of each toothed section is equal to the toothed circumferential length of the half-gear 402, which is also equal to the length of the gear frame 401 in one direction.

During the reciprocating motion of the gear frame 401, the half-gear 402 continuously rotates due to its alternating engagement with the two sides of the gear frame 401. And, conversely, when an external force causes the shaft 403 to continuously rotate, the half-gear 402 rotates with it, and, by alternatively engaging with two sides of the gear frame 401, causes the frame 401 to reciprocate along the rack bars axis.

The converters, shown on FIG. 1, FIG. 3, FIG. 4, can be applied in 2-stroke ICEs if the pistons are rigidly attached to the ends of the toothed racks or bars and the piston motion axis coincide with the axis of the gear bars (hereinafter replaced by "pistons are attached to").

Figure 5:
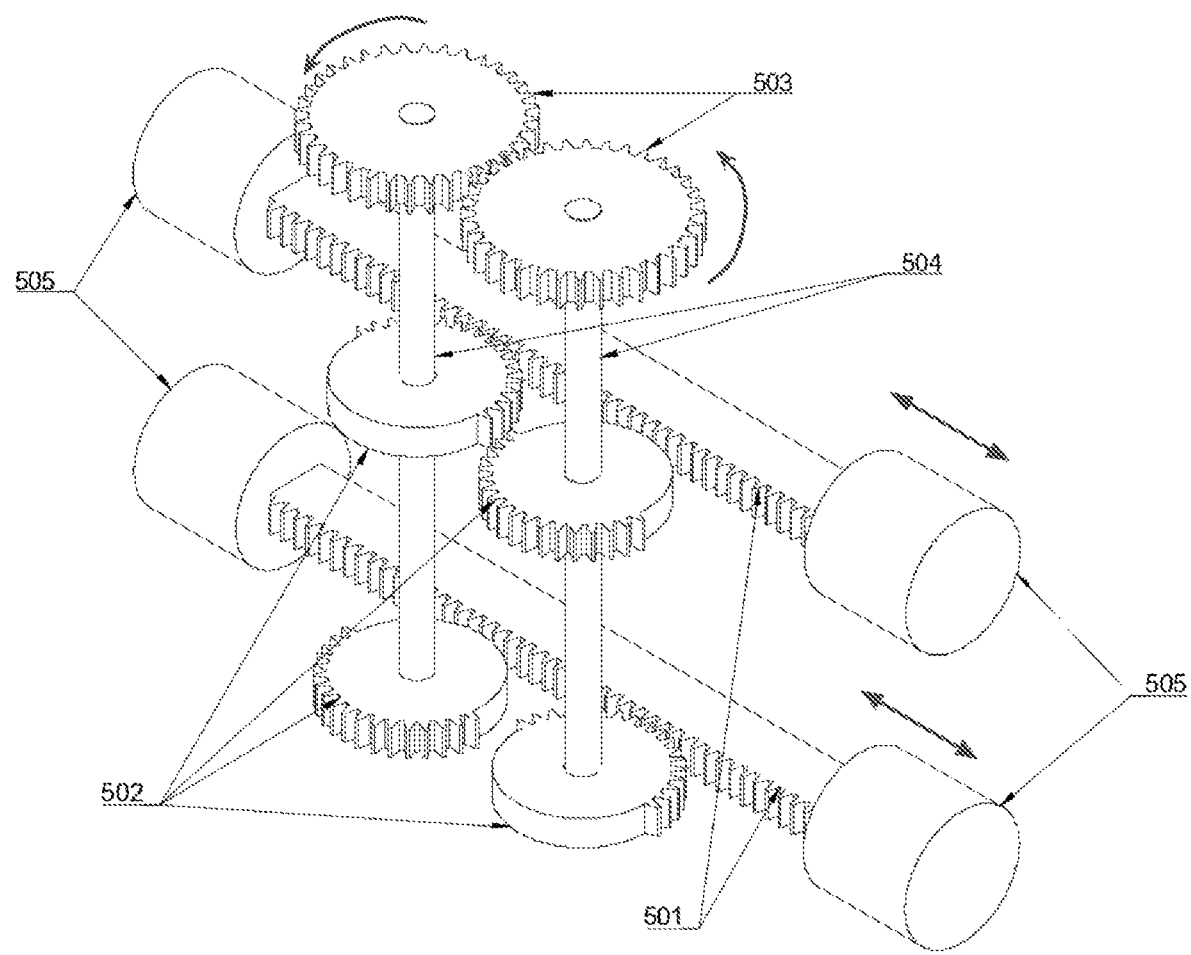
FIG. 5 shows the exemplary mechanical converter with corresponding gears engaged in opposing rotation.

FIG. 5 shows the first variant of the converter of reciprocating motion in rotary motion for the use in a four-cylinder opposed-piston ICE engine.

The converter comprises two parallel gear racks 501, four half-gears 502, two corresponding gears 503, and four pistons 505. The pistons 505 are attached to the ends of the gear racks 501 and the pistons motion axis coincide with the axis of the racks. Corresponding gears 503 are engaged to each other in opposing rotation. Each shaft 504 connects one corresponding gear 503 and two half-gears 502, which can engage with their corresponding gear racks 501. When any of the shafts 504 rotate, corresponding gears 503 and half-gears 502 rotate. Half-gears 502 on separate shafts, which correspond to the same gear rack 501, are deployed with a shift 180 degrees from each other such that when they are synchronously rotating in opposite directions, they alternately engaged with their corresponding gear rack 501—so only one of the two half-gears 502 engages with their corresponding rack 501 at any time. Therefore, when they are synchronously rotating in opposite directions, they force their corresponding rack 501 to reciprocate.

Half-gears 502, sitting on the same shaft 504, are shifted 180 degrees from each other. Due to this shift, both gear racks 501 (with attached pistons 505) perform a counter-reciprocating motion in opposite directions from each other.

Due to counter movements of the racks 501 and pistons 505 during the engine operation, the center of gravity position of the engine does not change, which increases the engine stability and minimizes the engine vibration while the engine is running.

Similarly but conversely, when under an external force, the pistons 504 and the gear frames 501 perform a reciprocation motion, and due to their alternate engagement with the gear frames 501, the half-gears 502 rotate.

Figure 6:
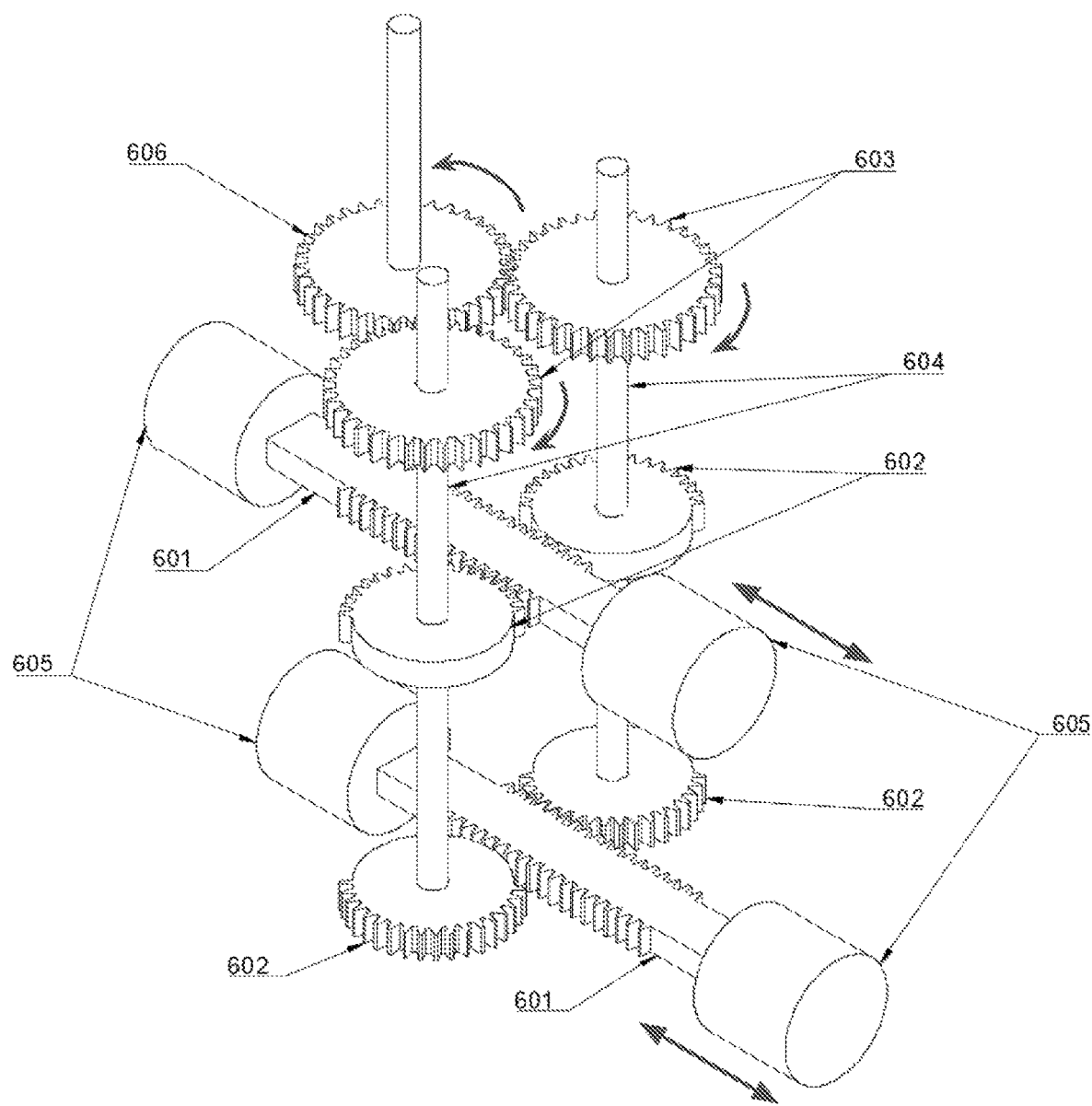
FIG. 6 shows the exemplary mechanical converter featuring two corresponding gears engaged to a shared gear.

FIG. 6 shows the second variant of the converter of reciprocating motion in rotary motion for use in a four-cylinder opposed-piston ICE engine. In order to reduce the dimensions of the converter, the gear racks 601 are shortened along their axial length but feature teeth sections on opposite sides. A pair of half-gears 602 is located next to each rack 601, with each of the pair of half-gears disposed on a different shaft 604 and deployed without a shift from each other. Each shaft 604 connects two half-gear 602 and one corresponding gear 603. Corresponding gears 603 are equi-diametrical and engaged with the shared gear 606. When the shared gear 606 rotates, the corresponding gears 603 and half-gears 602 rotate synchronously in the same rotational direction. When rotating, the half-gears 602 of each pair alternately engage with the corresponding gear racks 601, causing the corresponding gear racks to reciprocate.

Similarly but conversely, when under an external force, the pistons 604 and the gear frames 601 perform a reciprocation motion, and due to their alternate engagement with the gear frames 601, the half-gears 602 rotate.

Half-gears 602 that are disposed on the same shaft are shifted 180 degrees from each other. Due to this shift, both gear racks 601 (with attached pistons 605) perform a counter-reciprocating motion in opposite directions.

Due to the counter reciprocating motion of the racks 601 and pistons 605 during the engine operation, the center of gravity position of the engine does not change, which increases the engine stability and minimizes the engine vibration while the engine is running.

The shared gear 606, which ensures the synchronous rotation of corresponding gears 603 and half-gears 602, can be replaced by flexible toothed belt, embracing corresponding gears 603.

Figure 7:
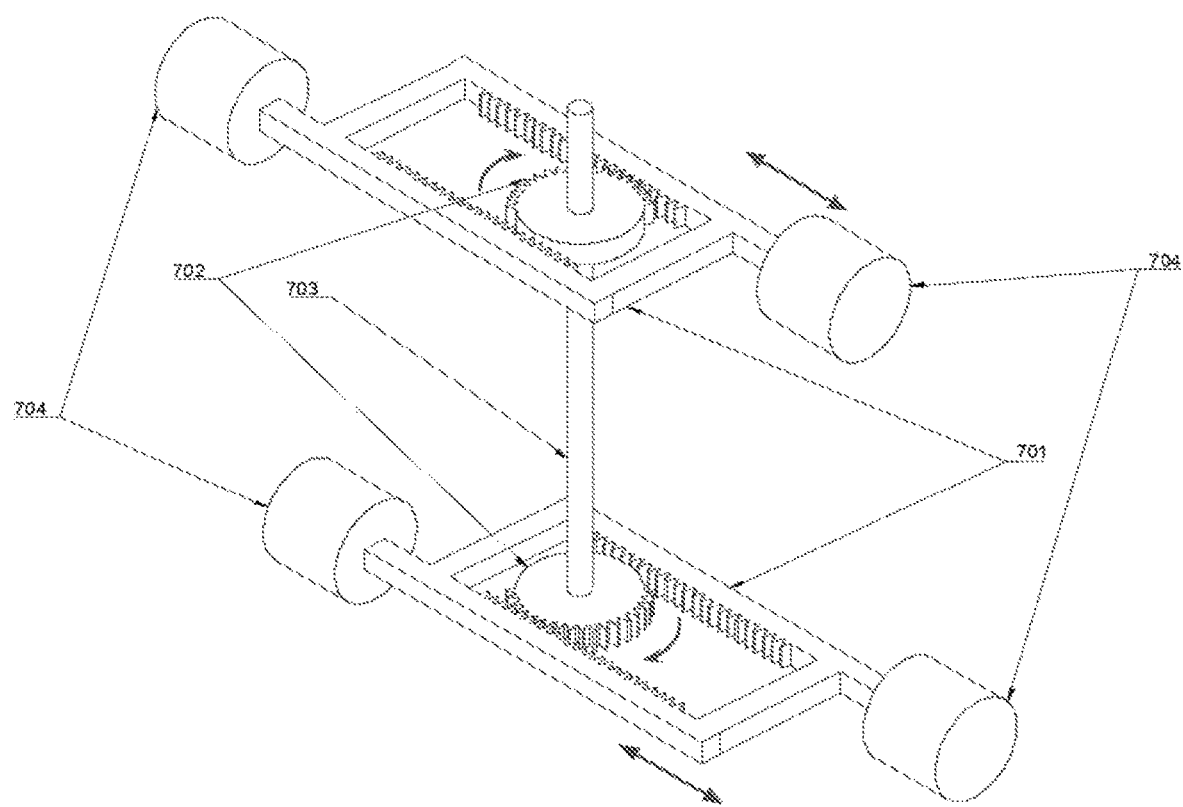
FIG. 7 shows the exemplary mechanical converter with a gear frame.

FIG. 7 shows the third variant of the converter of reciprocating motion into a rotary motion for use in a four-cylinder opposed-piston ICE engine.

The converter consists of two gear frames 701, and two half-gears 702, located inside the gear frames 701. Both half-gears are disposed on the same shaft 703. Four pistons 704 are rigidly attached to the endings of the frames 701, and the piston motion axis coincides with the axis of the frame racks endings. When the shaft 703 rotates, half-gears 702 rotate and alternately engage with the toothed sides of the gear frames 701, forcing them to reciprocate. And vice versa, if, under the external force to the pistons 704, the gear frames 701 perform a reciprocation motion, and then, due to alternate engagement with the gear frames 701, the half-gears 702 rotate. Half-gears 702 are shifted 180 degrees from each other. Due to this shift, both gear frames 701 and their pistons 704 perform counter reciprocating motion, thereby minimizing vibrations when the engine is running.

Figure 8:
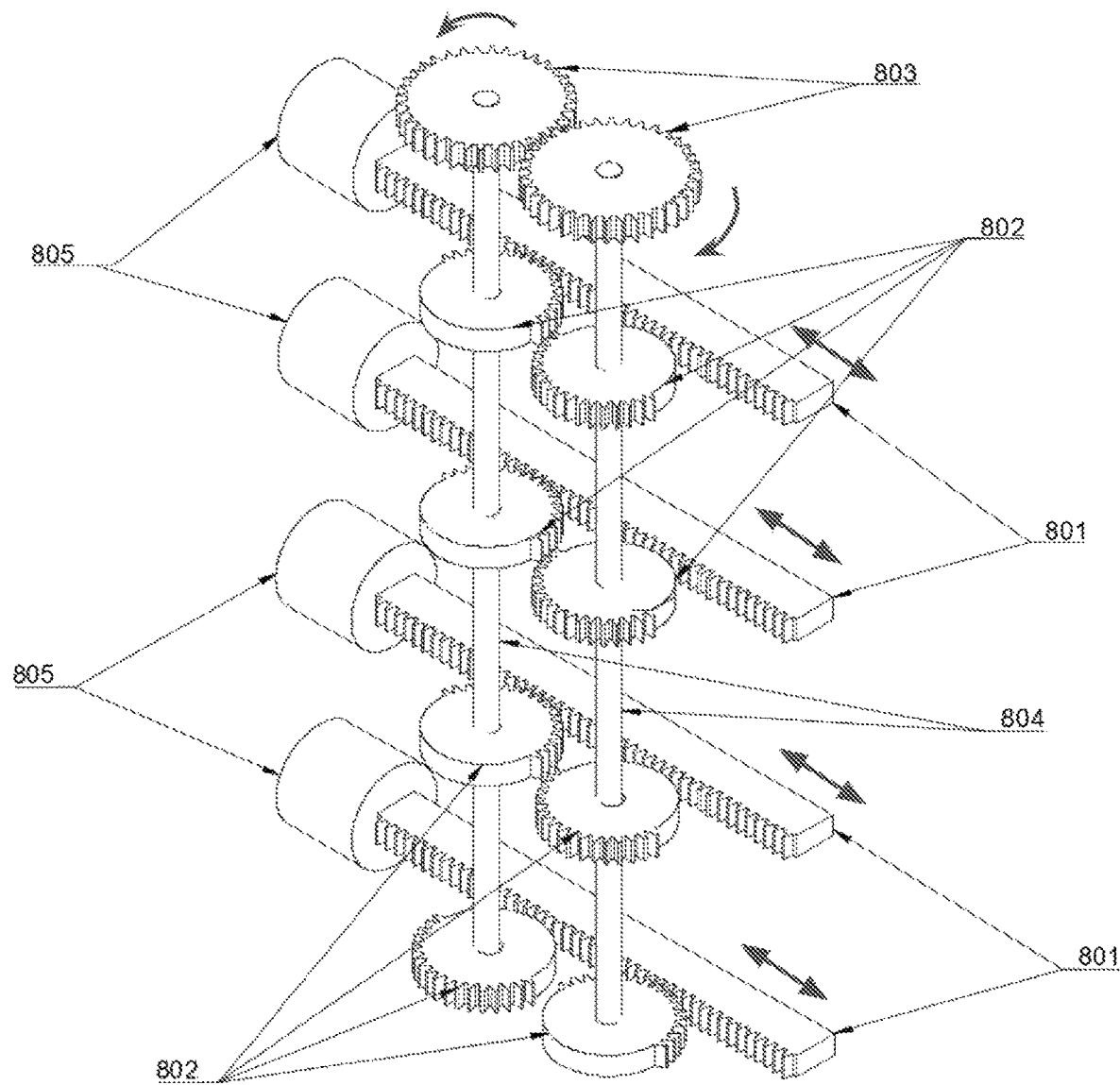
FIG. 8 shows the exemplary mechanical converter with corresponding gears engaged in opposing rotation.

FIG. 8 shows the first variant of the converter of reciprocating motion into a rotary motion for use in a four-cylinder inline ICE engine. The converter consists of four parallel vertical gear racks 801, eight half-gears 802, two corresponding gears 830 mutually engaged, and four pistons 805. The pistons are rigidly attached to the upper ends of the gear racks 801 and the piston motion axis coincides with the axis of the racks 801. Each pair of half-gears 802 which correspond to the same gear rack 801, are deployed with a shift 180 degrees from each other. When they are synchronously rotating in opposite directions, they alternately engage with the gear rack 801 so that only one half-gear 802 engages with the rack 801 at any given time and they are never both engaged at the same time. Therefore, when they are synchronously rotating in opposite directions, they force rack 801 to reciprocate.

Each shaft 804 connects four half-gears and one corresponding gear 803. When any shaft rotates, both corresponding gears 803 and all half-gears 802 rotate and alternately engage with corresponding gear racks 801, forcing them to reciprocate. And vice versa, if, under the action of the pistons 805, the gear racks 801 perform a reciprocation motion, and then, due to alternative engagement with the gear racks 801, the half-gears 802 rotate. Adjacent half-gears 802, sitting on the same shaft 804, are shifted 180 degrees from each other. Due to this shift, gear racks 801 with pistons 805 perform counter reciprocating motion, which minimize vibrations when the engine is running.

Figure 9:
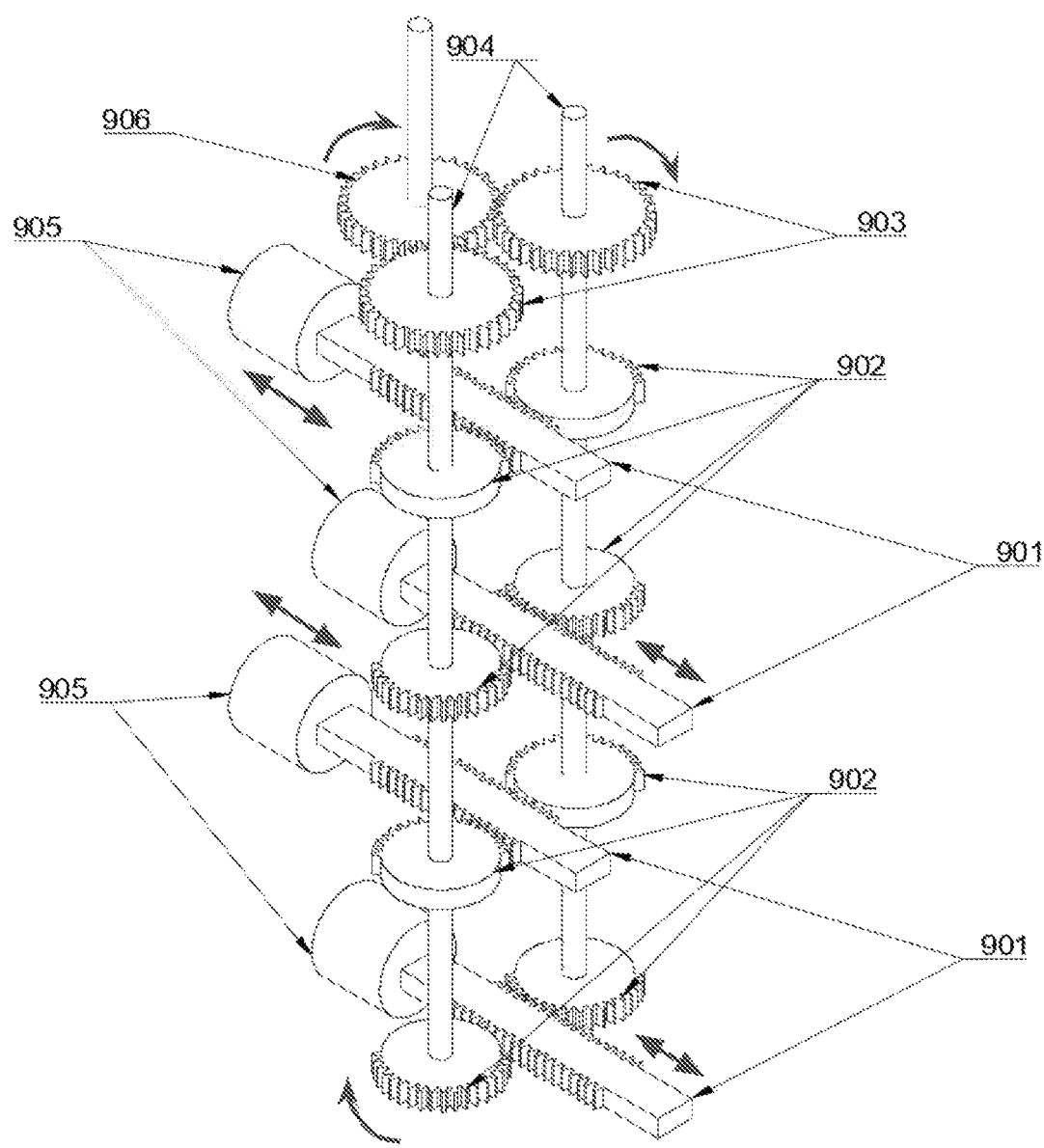
FIG. 9 shows the exemplary mechanical converter featuring two corresponding gears engaged to a shared gear.

FIG. 9 shows the second variant of the converter of reciprocating motion into a rotary motion for use in a four-cylinder inline ICE engine. In order to reduce the dimensions of the converter, the gear racks 901 are shortened along their axial length but feature teeth sections on opposite sides. A pair of half-gears 902 is located next to each rack 901, with each of the pair of half-gears disposed on a different shaft 904 and deployed without a shift from each other.

Each shaft 904 connects four half-gears 902 and one corresponding gear 903. Corresponding gears 903 are equi-diametrical and engaged with the shared gear 906. When the shared gear 906 rotates, the corresponding gears 903 and half-gears 902 rotate synchronously in the same rotational direction. When rotating, the half-gears 902 of each pair alternately engage with the corresponding gear racks 901, causing the corresponding gear racks to reciprocate.

Similarly but conversely, when under an external force, the pistons 904 and the gear frames 901 perform a reciprocation motion, and due to their alternate engagement with the gear frames 901, the half-gears 902 rotate. Half-gears 902 that are disposed on the same shaft are shifted 180 degrees from each other. Due to this shift, both gear racks 901 (with attached pistons 905) perform a counter-reciprocating motion in opposite directions. Due to the counter reciprocating motion of the racks 901 and pistons 905 during the engine operation, the center of gravity position of the engine does not change, which increases the engine stability and minimizes the engine vibration while the engine is running. The shared gear 906, which ensures the synchronous rotation of corresponding gears 903 and half-gears 902, can be replaced by flexible toothed belt, embracing corresponding gears 903.

Figure 10:
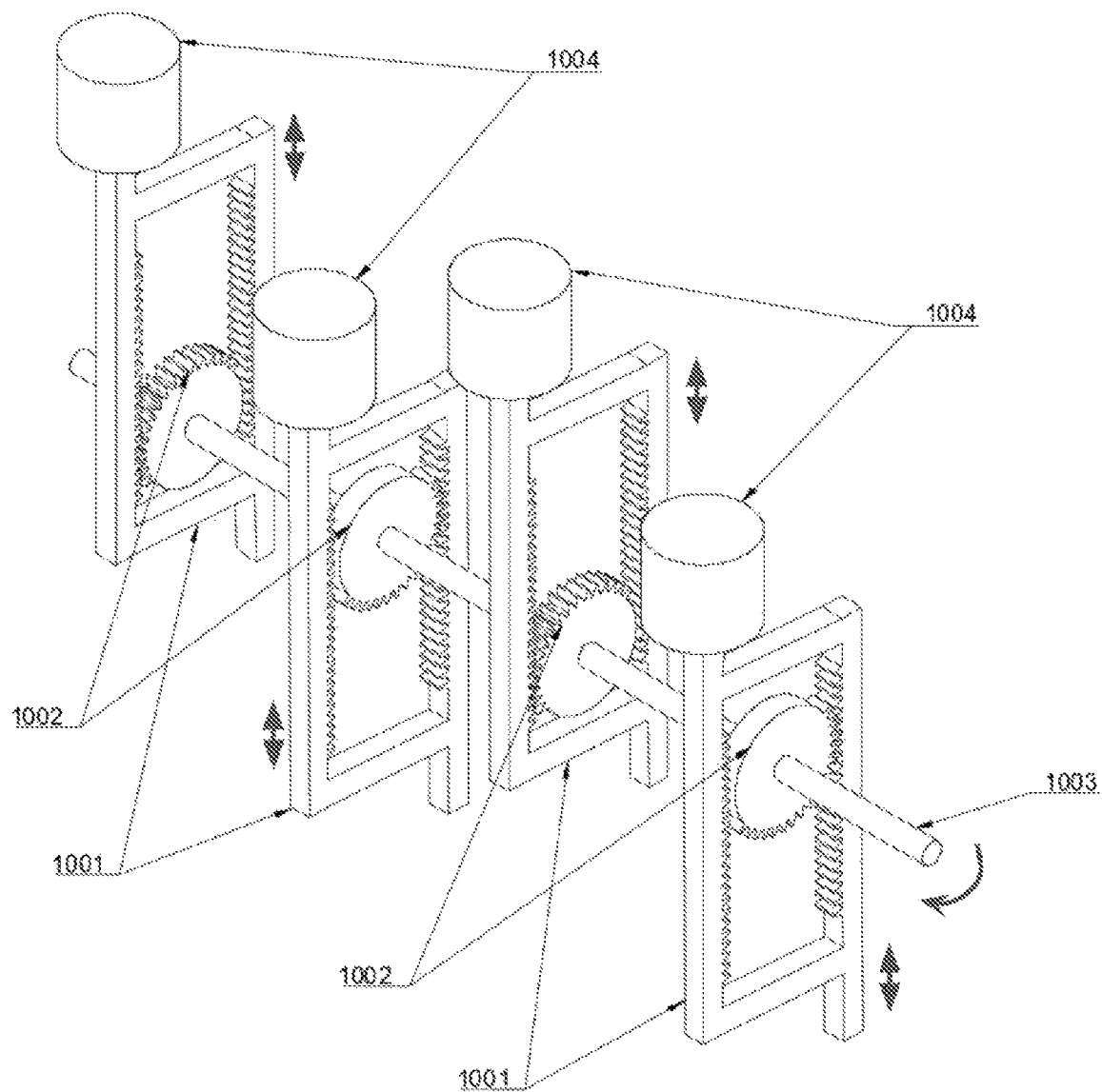
FIG. 10 shows the exemplary mechanical converter with a gear frame.

FIG. 10 shows the third variant of the converter of reciprocating motion into a rotary motion for use in a four-cylinder inline ICE engine. The converter consists of four gear frames 1001, and four half-gears 1002, located inside the gear frames 1001. All four half-gears are disposed on the same shaft 1003. Four pistons 1004 are rigidly attached to the endings of the frames 1001, and the piston motion axis coincides with the axis of the frame racks endings.

When the shaft 1003 rotates, half-gears 1002 rotate and alternately engage with the toothed sides of the gear frames 1001, forcing them to reciprocate. And vice versa, if, under the external force to the pistons 1004, the gear frames 1001 perform a reciprocation motion, and then, due to alternate engagement with the gear frames 1001, the half-gears 1002 rotate.

Adjacent half-gears 1002 are shifted 180 degrees from each other. Due to this shift, both adjacent gear frames 1001 and their adjacent pistons 1004 perform counter reciprocating motion, thereby minimizing vibrations when the engine is running.

Note: converters, presented on FIG. 8, FIG. 9 and FIG. 10 or the use in four-cylinder inline ICE engine, can be easily transformed to be used in eight-cylinder opposed-piston ICE by attaching additional pistons to the free ends of their gear racks or gear frame bars.

Figure 11:
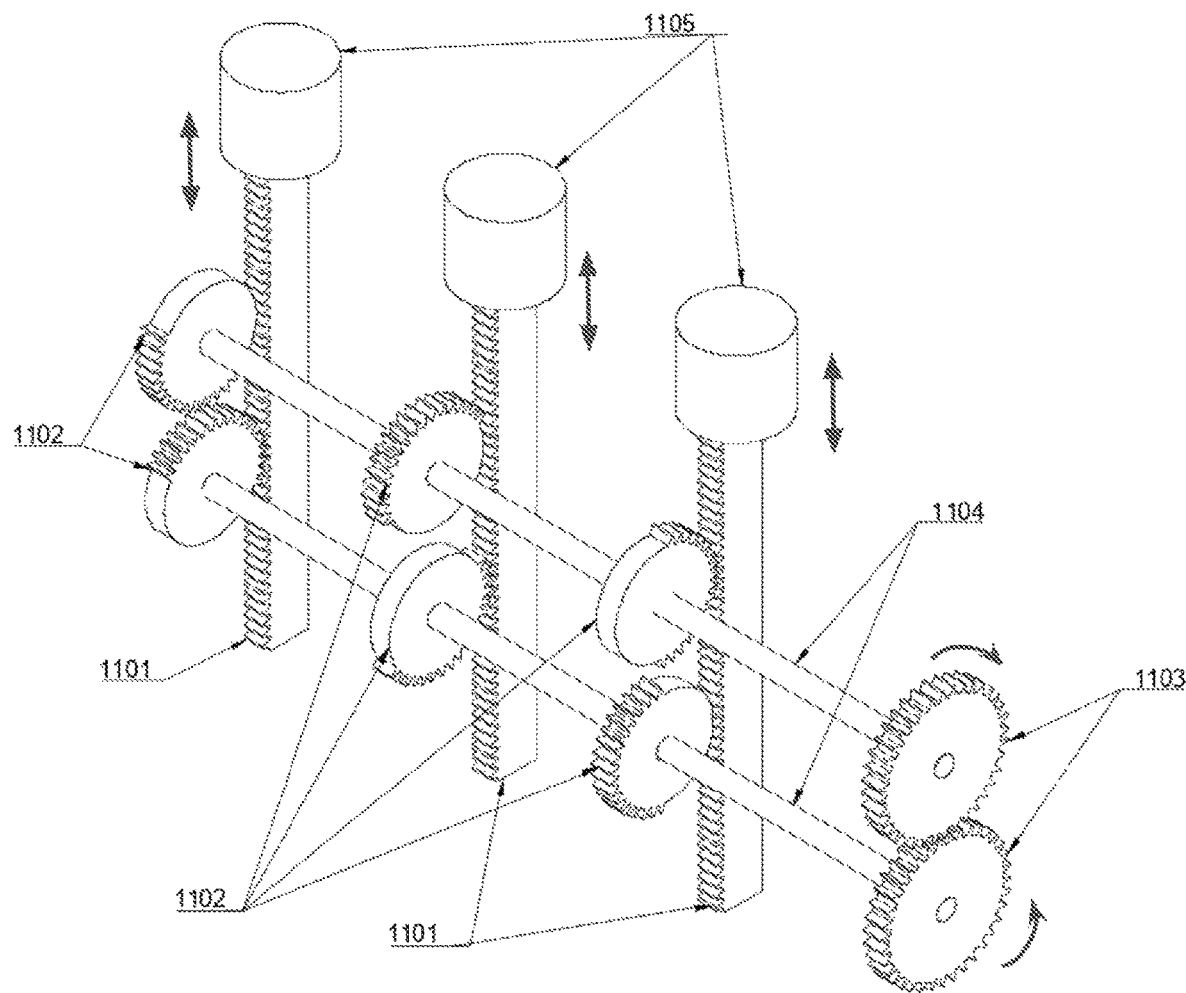
FIG. 11 shows the exemplary mechanical converter with corresponding gears engaged in opposing rotation.

FIG. 11 shows a variant of the converter of reciprocating motion into a rotary motion for use in three-cylinder inline ICE engine.

The converter consists of three vertical parallel gear racks 1101, six half-gears 1102, two corresponding gears 1103, and three pistons 1105, which are rigidly attached to the upper ends of the gear racks 1101. The piston motion axis coincides with the axis of the racks 1101.

Each shaft 1104 connects three half-gears 1102 and one corresponding gear 1103. Corresponding gears 1103 are mutually engaged to a shared gear. Adjacent half-gears 1102, sitting on the same shaft 1104, are shifted +120 degrees from each other.

Half-gears 1102, which correspond to the same gear rack 1101, are deployed with a shift 180 degrees from each other in their initial position such that when they are synchronously rotating in opposite directions, they alternately engage with the gear rack 1101. Thus, only one half-gear 1102 engages with the gear rack 1101 at any time and never both half-gears are engaged with the same gear rack simultaneously. Therefore, when they are synchronously rotating in opposite directions, they force rack 1101 to reciprocate.

When any shaft rotates, both corresponding gears 1103 and all half-gears 1102 rotate and alternately engage with corresponding toothed racks 1101, forcing them to reciprocate. And vice versa, if, under the action of the pistons 1105, the toothed racks 1101 perform a reciprocation motion, and then, due to alternative engagement with the gear racks 1101, the half-gears 1102 rotate.

Figure 12:
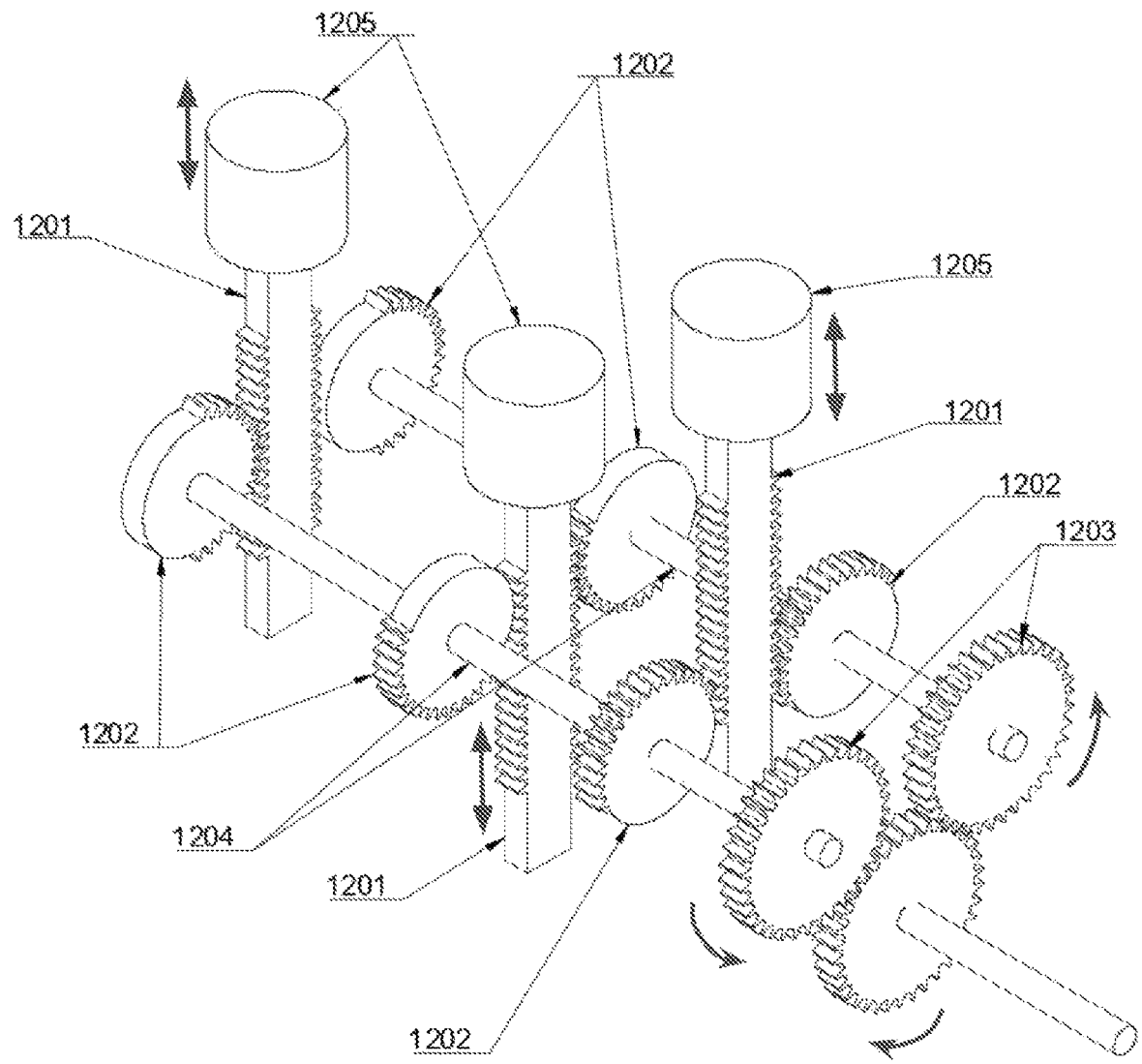
FIG. 12 shows the exemplary mechanical converter featuring two corresponding gears engaged to a shared gear.

FIG. 12 shows a second version of the converter of reciprocating motion in rotary motion for use in three-cylinder inline ICE engine.

In order to reduce the dimensions of the converter, the gear racks 1201 are shortened along their axial length but feature teeth sections on opposite sides. A pair of half-gears 1202 is located next to each rack 1201, with each of the pair of half-gears disposed on a different shaft 1204 and deployed without a shift from each other.

Each shaft 1204 connects three half-gear 1202 and one corresponding gear 1203. Corresponding gears 1203 are equi-diametrical and engaged with a shared gear. When the shared gear rotates, the corresponding gears 1203 and half-gears 1202 rotate synchronously in the same rotational direction.

When rotating, the half-gears 1202 of each pair alternately engage with the corresponding gear racks 1201, causing the corresponding gear racks to reciprocate.

Similarly but conversely, when under an external force, the pistons 1205 and the gear racks 1201 perform a reciprocation motion, and due to their alternate engagement with the gear racks 1201, the half-gears 1202 rotate.

Adjacent half-gears 1202 that are disposed on the same shaft are shifted 120 degrees from each other Due to the counter reciprocating motion of the racks 1201 and pistons 1205 during the engine operation, the center of gravity position of the engine does not change, which increases the engine stability and minimizes the engine vibration while the engine is running.

The shared gear, which ensures the synchronous rotation of corresponding gears 1203 and half-gears 1202, can be replaced by flexible toothed belt, embracing corresponding gears 1203.

Figure 13:
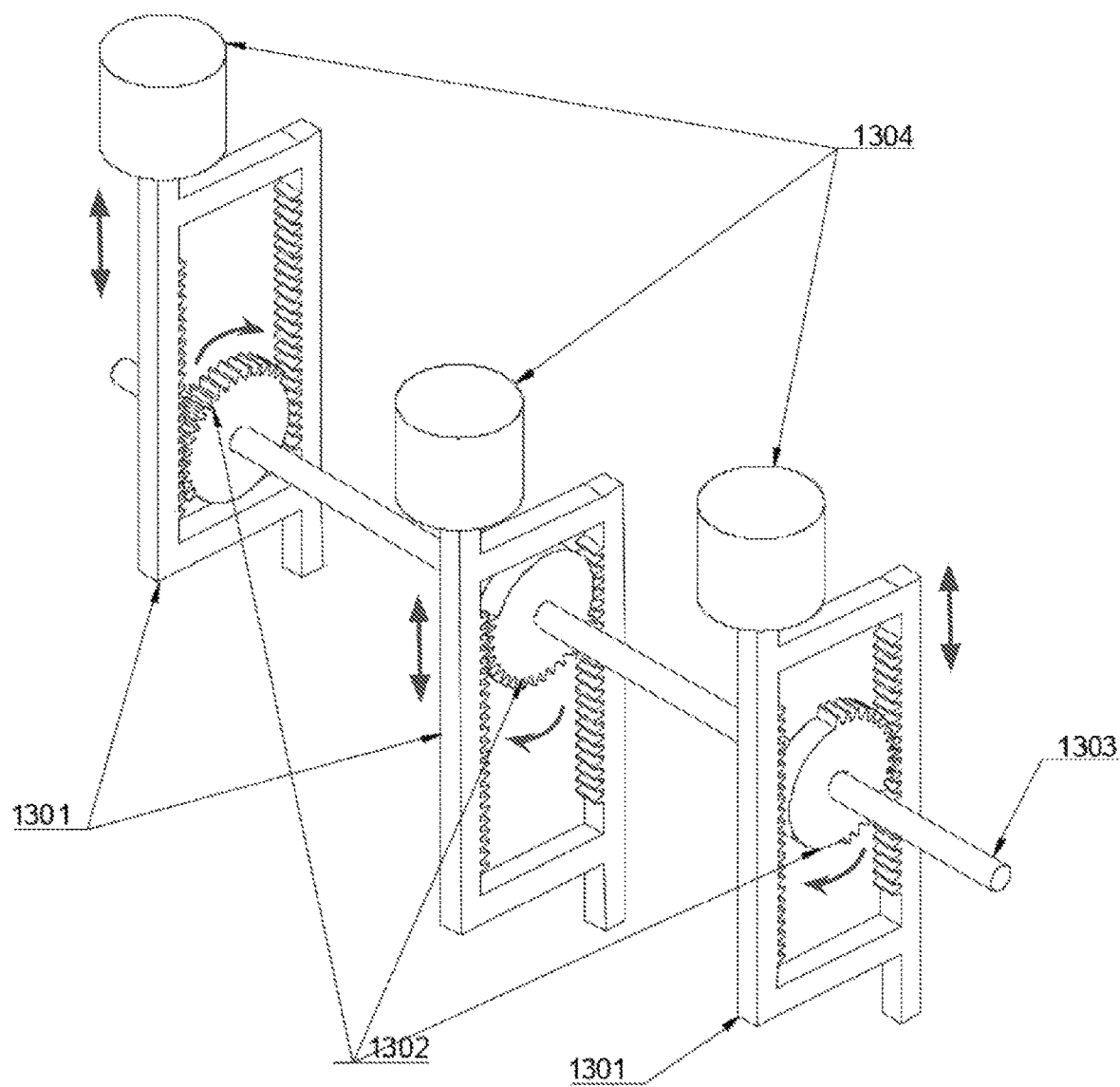
FIG. 13 shows the exemplary mechanical converter with a gear frame.

FIG. 13 shows a third variant of the converter of reciprocating motion into a rotary motion for use in three-cylinder inline ICE engine. The converter consists of three gear frames 1301, three half-gears 1302 located inside gear frames 1301 and sitting on one shaft 1303, and three pistons 1304, which are rigidly attached to the endings of the gear frames 1301 and the axial motion of which coincide with the axis of the frame racks endings.

Three half-gears 1302, located inside toothed frames 1301, are sitting on the same shaft 1303 and shifted +120 degrees to each other. When the shaft 1303 rotates, half-gears 1302 rotate and alternately engage with the toothed sides of the gear frames 1301, forcing them and pistons 1304 to reciprocate. And vice versa, if, under the external force to the pistons 1304, the toothed frames 1301 perform a reciprocation motion, and then, due to alternate engagement with the gear frames 1301, the half-gears 1302 rotate.

Due to the shift between half-gears, the vibration is minimized when the engine is running. Note: the converter of reciprocating motion into a rotary motion, presented on FIG. 11, FIG. 12 and FIG. 13 for the use in three-cylinder inline ICE engine, can be easily transformed to be used in six-cylinder opposed-piston ICE by attaching additional pistons to the free ends of their gear racks or gear frame bars.

Figure 14:
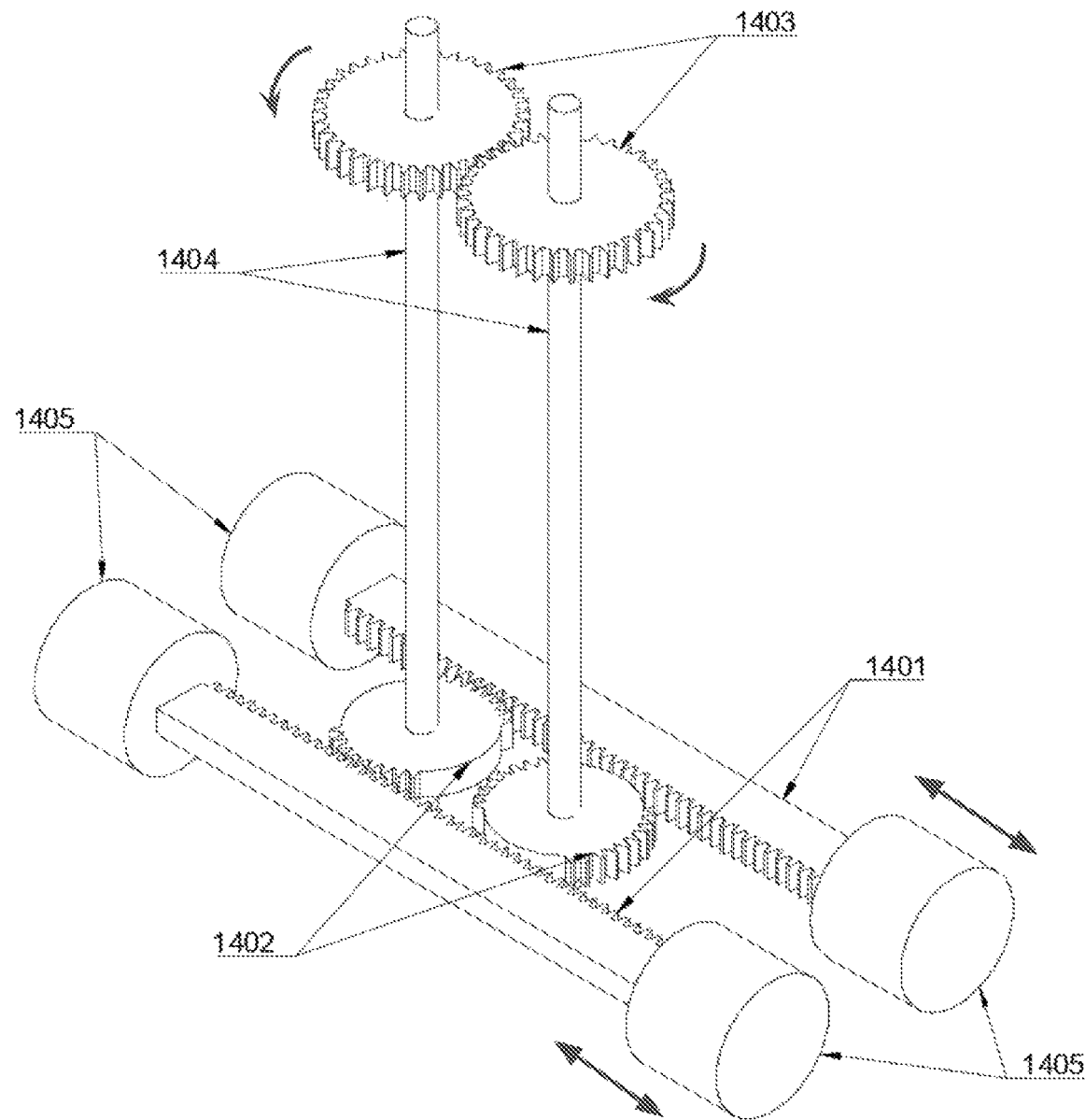
FIG. 14 shows the exemplary mechanical converter with corresponding gears engaged in opposing rotation.

FIG. 14 shows the forth variant of the converter of reciprocating motion into rotary motion for use in a four-cylinder opposed-piston ICE engine. In order to simplify the design, the converter uses half-gears with two toothed parts. The toothed parts of a half-gears are alternating with equal in length toothless parts such that the two equally long toothed parts of a given half-gear are disposed on opposite sides of that half-gear. The length of the each toothed and toothless part of the half-gears 1402 is equal to the travel length of the gear rack 1401 in one direction. Each shaft 1404 connects half-gear 1402 and corresponding gear 1403. Corresponding gears 1403 are identical and engaged with each other. Two half-gears 1402 are located between parallel gear racks 1401, and deployed with a shift 90 degrees from each other in their initial position in such a way, that when they are synchronously rotating in opposite directions, they alternately engage with the gear racks 1401—so only one half-gear 1402 engages with both racks 1401 at any time and never both half-gears are engaged with the gear rack simultaneously. Therefore, when they are synchronously rotating in opposite directions, they alternately engage with racks 1401, forcing racks 1401 with pistons 1405 to perform a reciprocating motions in opposite directions.

The well-known free piston ICE (Van Blarigan's engine) is essentially a linear generator of electricity and has a high (about 70%) efficiency due to the lack of a crank mechanism. Two-stroke ICEs, based on converters, presented on FIG. 1 and FIG. 3, can be transformed to linear reciprocating generators of electricity.

Figure 15:
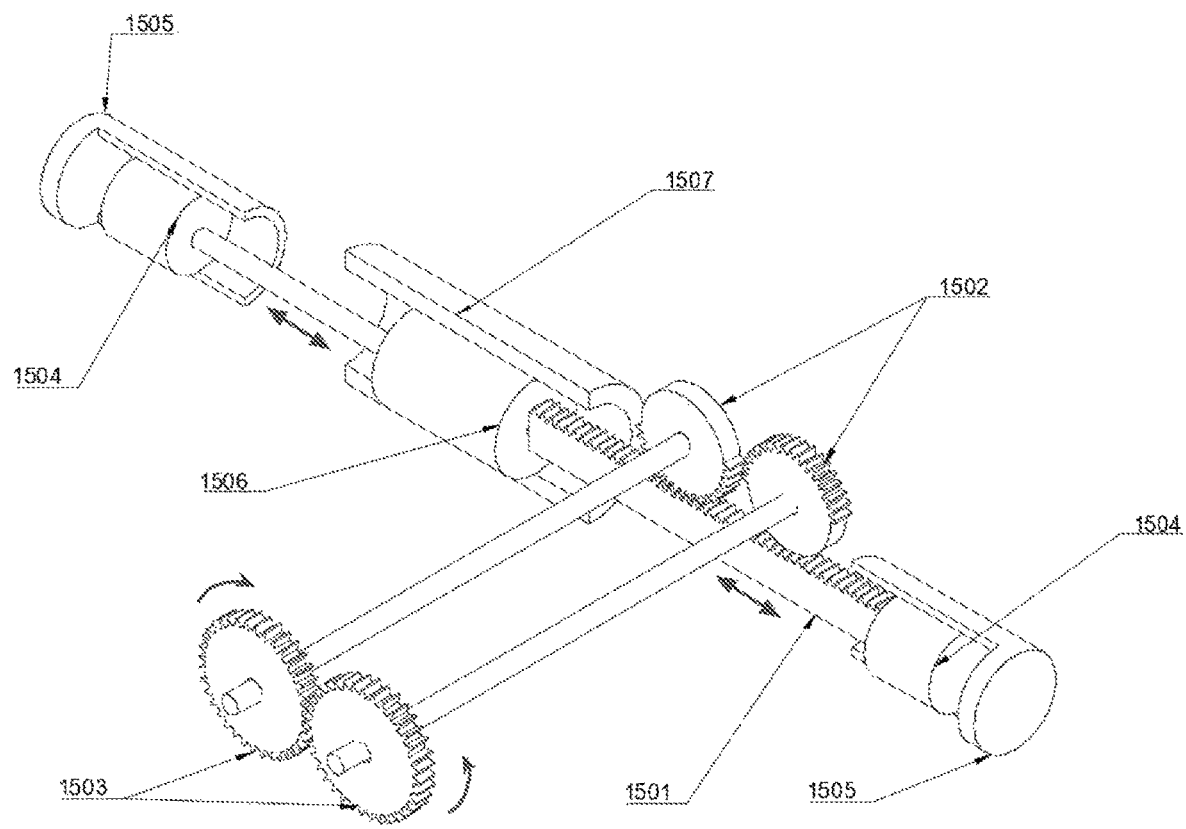
FIG. 15 shows the exemplary mechanical converter with corresponding gears engaged in opposing rotation.

FIG. 15 shows the variant of a linear generator. Two pistons 1504 are located in two separate cylinders 1505. The pistons are inter-connected by rack 1501, which has a toothed part. A permanent magnet 1506 is fixed around a toothless part of the rack 1501, and this construction acts as an anchor for a generator. It is known, that usage of permanent rare earth magnets in high performance linear generators allows to reduce the mass of generator's anchor. The electromagnetic generator stator winding 1507 is located around the permanent magnet 1506 with a minimal gap, providing movability for the anchor.

When the engine is operated, the air-fuel mixture is ignited alternatively in two cylinders 1505, which cases rack 1501 with permanent magnets 1506 to reciprocate and electromagnetic windings 1507 to generate electricity.

Half-gears 1502 and corresponding gears 1503 provide a conversion of the rack's reciprocating motion to rotary motion. This linear generator operates similarly to a known linear generator, based on free-piston ICE, and has the following advantages: 1. both, linear generator and engine functionalities can be used simultaneously, and 2. an ignition timing is simplified, because the pistons' position in the cylinders are easily determined by the position of the rack 1501 and by the angle of rotation of the half-gears 1502 or corresponding gears 1503.

It is known, that two-stroke ICE with opposite piston movement, like, for example, Opposed-piston, Opposed-Cylinder (OPOC) engine by company Ecomotors [4], has about 50% higher efficiency. Replacing crankshaft and connecting rods, used in such engine, with gear converter of reciprocation to rotational motion, will allow additional efficiency increase of up to 1.5 times more and to get multiple variants and configurations of ICEs with opposite piston movement.

Figure 16:
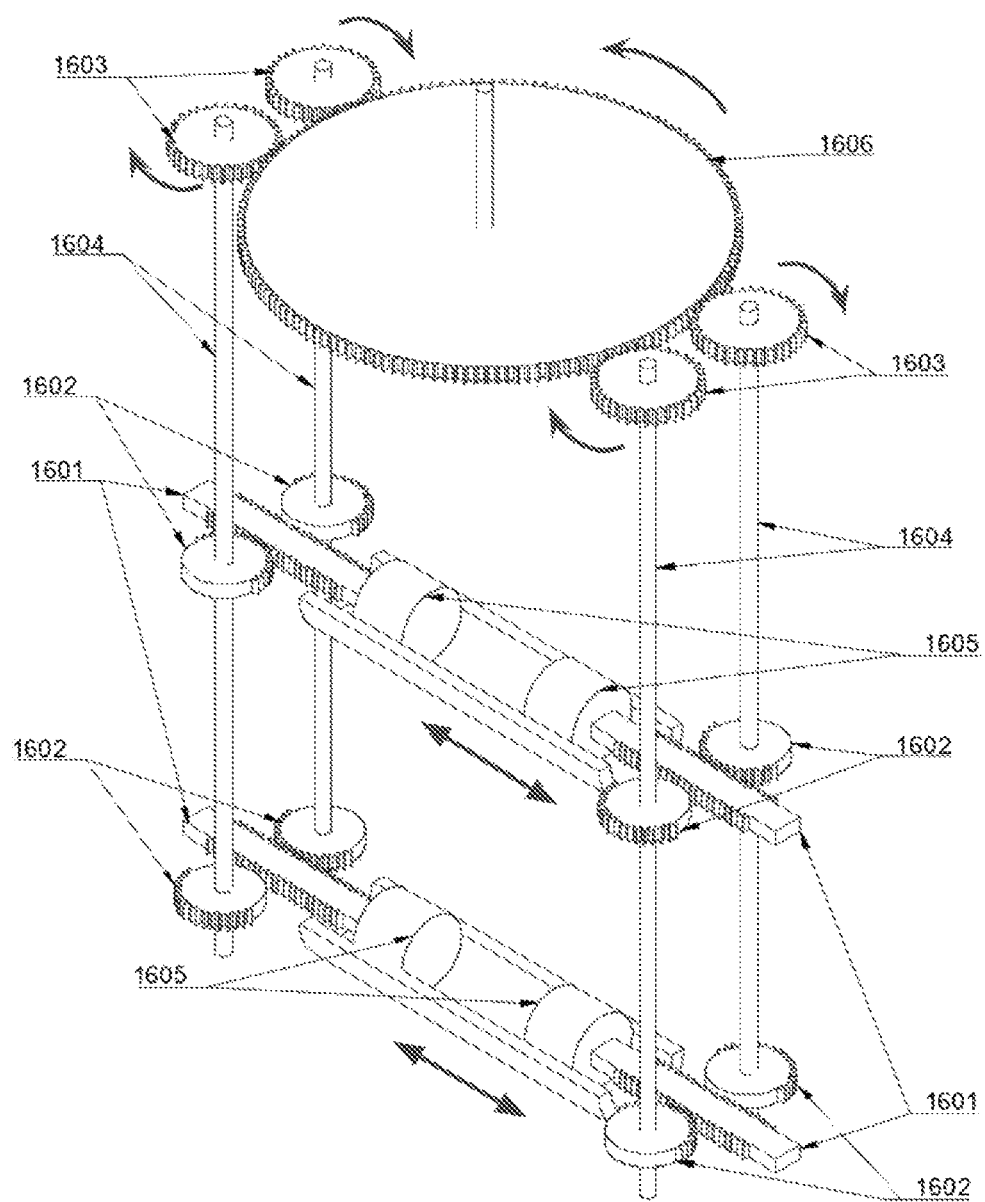
FIG. 16 shows the exemplary mechanical converter featuring two corresponding gears engaged to a shared gear.

FIG. 16 shows the first variant of the converter of reciprocating motion in rotary motion for use in a two-stroke ICE with opposite piston movement. The converter comprises two cylinders with two pistons 1605 inside each one. The cylinders are deployed parallel to each other. The gear racks 1601 are rigidly attached to the pistons 1605, and the piston motion axis coincides with the axis of the racks. A pair of half-gears 1602 is located next to each rack 1601 (one half-gear 1602 on each toothed side of the rack) without a shift from each other. Half-gears 1602, located on opposite sides of the piston and cylinder, are shifted 180 degrees from each other. Each of the four shafts 1604 connects two half-gears 1602, shifted 180 degrees to each other, and a corresponding gear 1603, and the four corresponding gears are in turn engaged with a shared gear 1606. When the shared gear 1606 rotates, all corresponding gears 1603 and half-gears 1602 rotate synchronously in the same direction as each other but opposite the shared gear.

When rotating, the half-gears 1602 of each pair alternately engage with the corresponding gear racks 1601, causing them to reciprocate. When the engine is operated, the fuel-air mixture is ignited alternately between pistons 1605 in the cylinders. Following the combustion in one cylinder, pistons 1605 of that cylinder move apart and push gear racks 1601, which, in turn, rotate engaged half-gears 1602. As a result, corresponding shafts 1604 with corresponding gears 1603 and half-gears 1602 rotate, forcing the shared gear 1606, other gears 1603, shafts 1604 and half-gears 1602 to rotate too, which in turn cause gear racks 1601 and pistons 1605 of a second cylinder to move towards each other. Due to all counter movements during the engine operation, the engine vibration is minimal.

The gear wheel 1606, which ensures synchronous rotation of corresponding gears 1603, can be replaced with a flexible toothed belt, embracing corresponding gears 1603.

Figure 17:
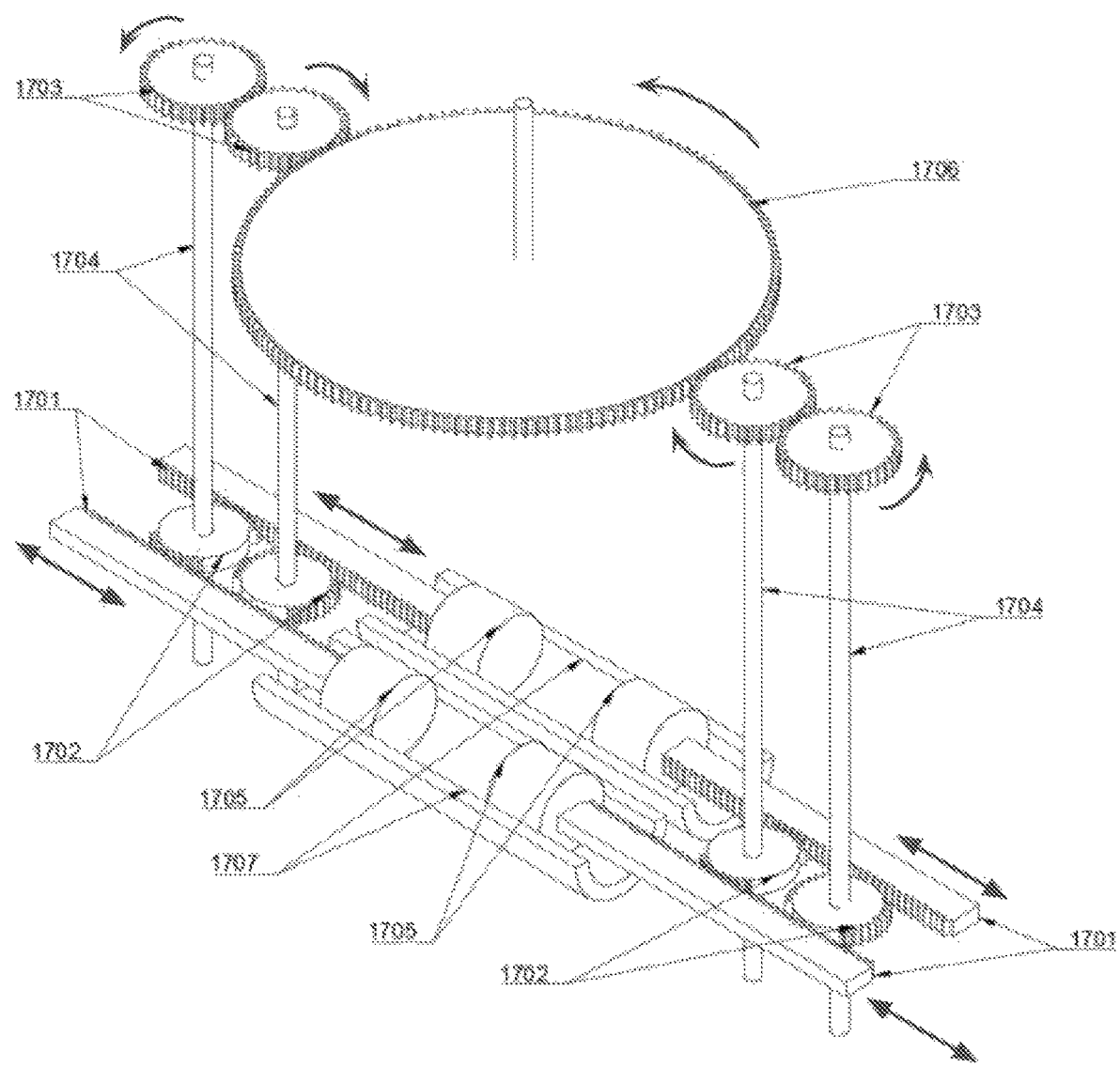
FIG. 17 shows the exemplary mechanical converter featuring two corresponding gears engaged to a shared gear, with each corresponding gear engaged to a secondary corresponding gear in opposing rotation.

FIG. 17 shows the second variant of the converter of reciprocating motion into rotary motion for use in a two-stroke ICE with opposite piston movement. The converter comprises two cylinders 1707 with two pistons 1705 inside each cylinder. The cylinders are deployed parallel to each other. The toothed racks 1701 are rigidly attached to the piston 1705 centers, and the piston motion axis coincides with the axis of the racks. In order to simplify the design, the converter uses half-gears 1702 with two toothed parts, equal in length and alternating with toothless parts. The length of each toothed part of half-gear 1702 is equal to the travel length of the rack 1701 in one direction. A pair of half-gears 1702 is located between parallel gear racks 1701 on each side of cylinders. Adjacent half-gears are deployed with a shift 90 degrees to each other in their initial position in such a way, that when they are synchronously rotating in opposite directions, they alternately engage with corresponding pair of gear racks 1701—so only one half-gear 1702 engages with both racks 1701 at any time and never both half-gears are engaged with the gear rack simultaneously.

Therefore, when half-gears 1702 are synchronously rotating in opposite directions and alternately engage with gear racks 1701, forcing racks 1701 with pistons 1705 to perform a counter reciprocating motions. Each of the four shafts 1704 connects one half-gear 1702 and one corresponding gear 1703. Corresponding gears 1703 are identical and engaged with each other in pairs. Shared gear 1706 engages with one corresponding gear 1703 of each pair, ensuring synchronous rotation of all gears 1703.

When the engine is operated, the fuel-air mixture is ignited between pistons 1705 in cylinders 1707 alternatively. Following the combustion in one cylinder 1707, pistons 1705 of this cylinder 1707 move apart and pistons 1705 of a second cylinder move towards each other. As a result, pistons 1705 and racks 1701 make counter reciprocation motions. Due to all counter movements during the engine operation, the engine vibration is minimal.

Figure 18A:
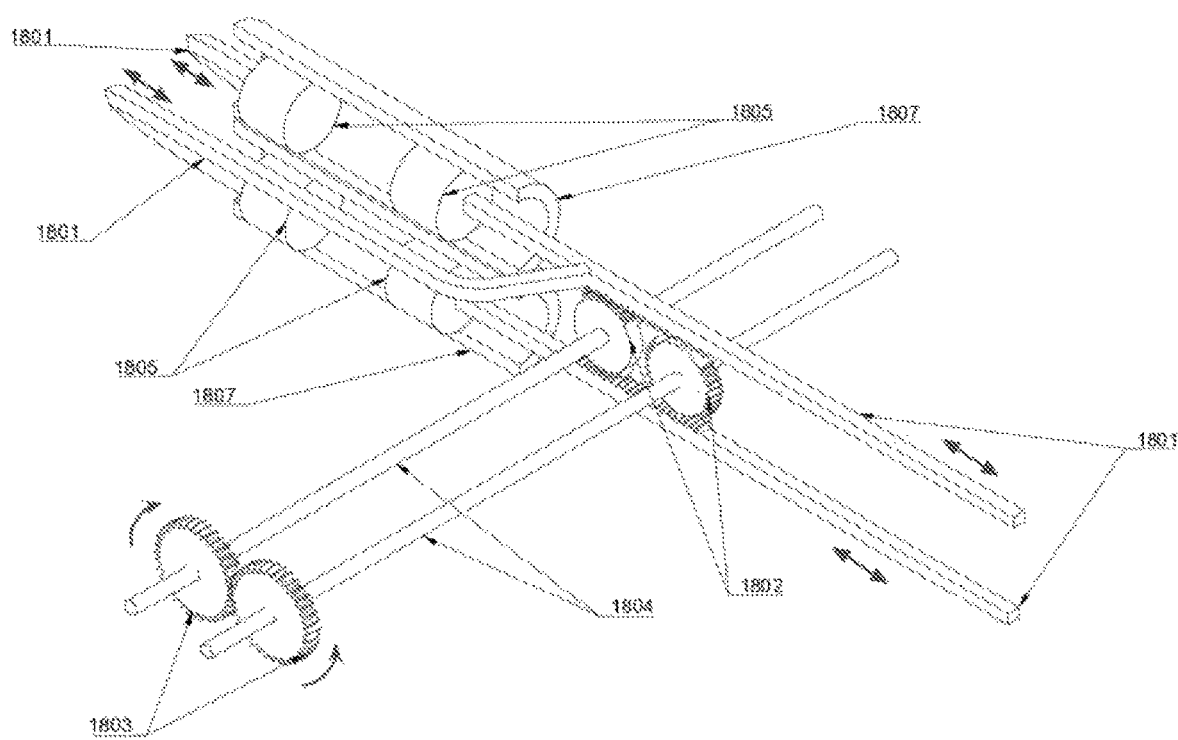
FIGS. 18a-b shows the exemplary mechanical converter with corresponding gears engaged in opposing rotation.
Figure 18B:
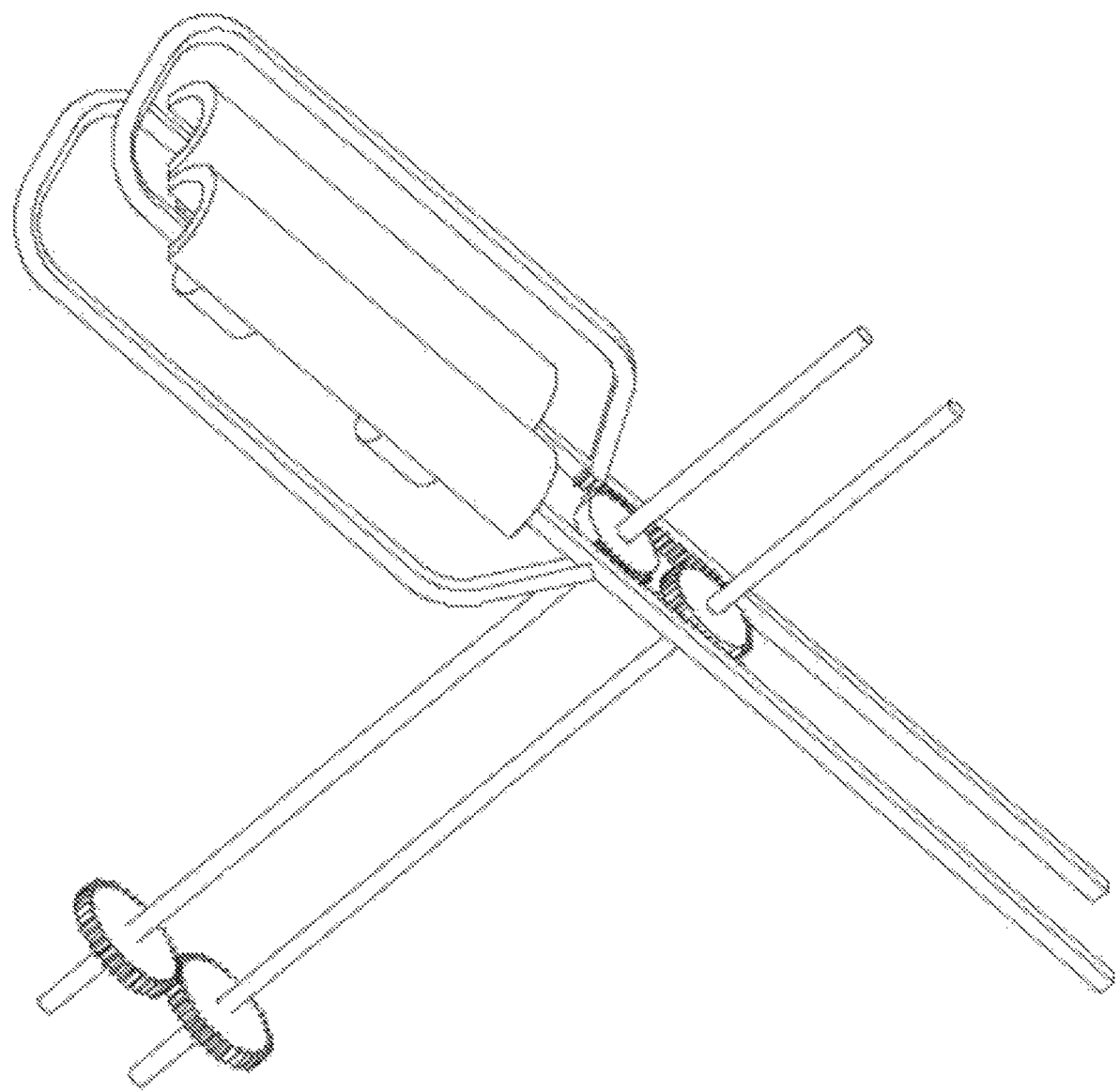

FIG. 18a-b show the third variant of the converter of reciprocating motion into rotary motion for use in a two-stroke ICE with opposite piston movement. The converter comprises two cylinders 1806 with two pistons 1805 inside each cylinder, two gear racks 1801, two Z-shaped tractions 1807, two shafts 1804, two half-gears 1802 and two corresponding gear wheels 1803. The cylinders 1806 are deployed parallel to each other with one above the other. Gear racks 1801 are deployed parallel to each other. The left side of each gear rack 1801 is attached to the right piston 1805 of one cylinder 1806 and via the Z-shaped traction 1807 to the left piston 1805 of another cylinder 1807.

Each shaft 1804 connects a half-gear 1802 and a corresponding gear 1803. Corresponding gears 1803 are identical and engaged with each other. Two half-gears 1802 are located between parallel gear racks 1801, and deployed with a shift 90 degrees to each other in their initial position in such a way that when they are synchronously rotating in opposite directions, they alternately engage with both gear racks 1801. When the engine is operated, the fuel-air mixture is ignited alternately between the pistons 1805 in the cylinders. Following the combustion in the cylinders, pistons 1805 of one cylinder with connected Z-shaped fractions 1807 move apart, causing pistons 1805 of a lower cylinder 1807 to move towards each other. Following the combustion in lower cylinder 1806, pistons 1805 of this cylinder with connected Z-shaped tractions 1807 move apart, causing pistons 1805 of an upper cylinder 1806 move towards each other. As a result, pistons 1805 with connected Z-shaped tractions 1807 and racks 1801 make counter reciprocation motions and gears 1803 and half gears 1802 make counter rotational motions. Due to all counter movements during the engine operation, the engine vibration is minimal.

Figure 19:
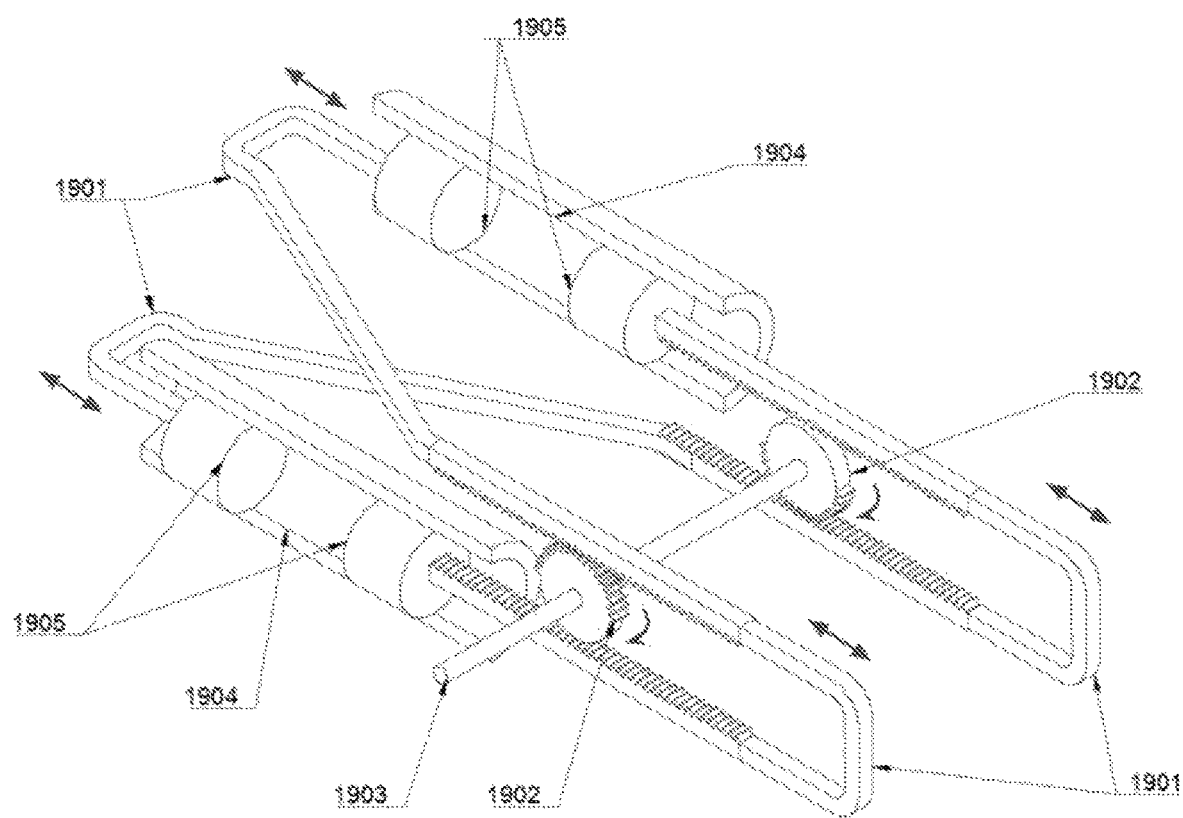
FIG. 19 shows the exemplary mechanical converter with a gear frame, the gear frame being Z-shaped.

FIG. 19 shows the fourth variant of the converter of reciprocating motion into rotary motion for use in a two-stroke ICE with opposite piston movement. The converter has two cylinders 1904 with two pistons 1905 inside each cylinder, two Z-shaped gear frames 1901, one shaft 1903, and two half-gears 1902. The cylinders 1904 are deployed parallel to each other. The left piston 1905 of one cylinder 1904 and the right piston 1905 of another cylinder 1904 are rigidly connected with the Z-shaped gear frame 1901.

The half-gears 1902 are located in the left part of each Z-shaped gear frame 1901. The left parts of each Z-shaped gear frame 1901 are bent in a vertical plane and half-gears 1902 are enclosed between two rectilinear and parallel "toothed" sections of the frame 1901. Half-gears 1902, sit on the shaft 1903 and are deployed with a shift 180 degrees to each other, that when they are rotating, they alternately engage with the two 'toothed' sides of the corresponding Z-shaped gear frames 1901. The coupling of the Z-shaped gear frames 1901 and half-gears 1902 allows to transfer the energy of motion of both pistons 1905 to the rotation of both half-gears 1902.

When the engine is operated, the fuel-air mixture is ignited between pistons 1905 in both cylinders 1904 alternatively. Following the combustion in one cylinder 1904, pistons 1905 of this cylinder move apart and push Z-shaped gear frames 1901, which, in turn, cause pistons 1905 of a second cylinder to move towards each other. Pistons and Z-shaped gear frames counter reciprocate, alternatively engaging with half-gears 1902, causing them to rotate. Due to all counter movements during the engine operation, the engine vibration is minimal.

Figure 20:
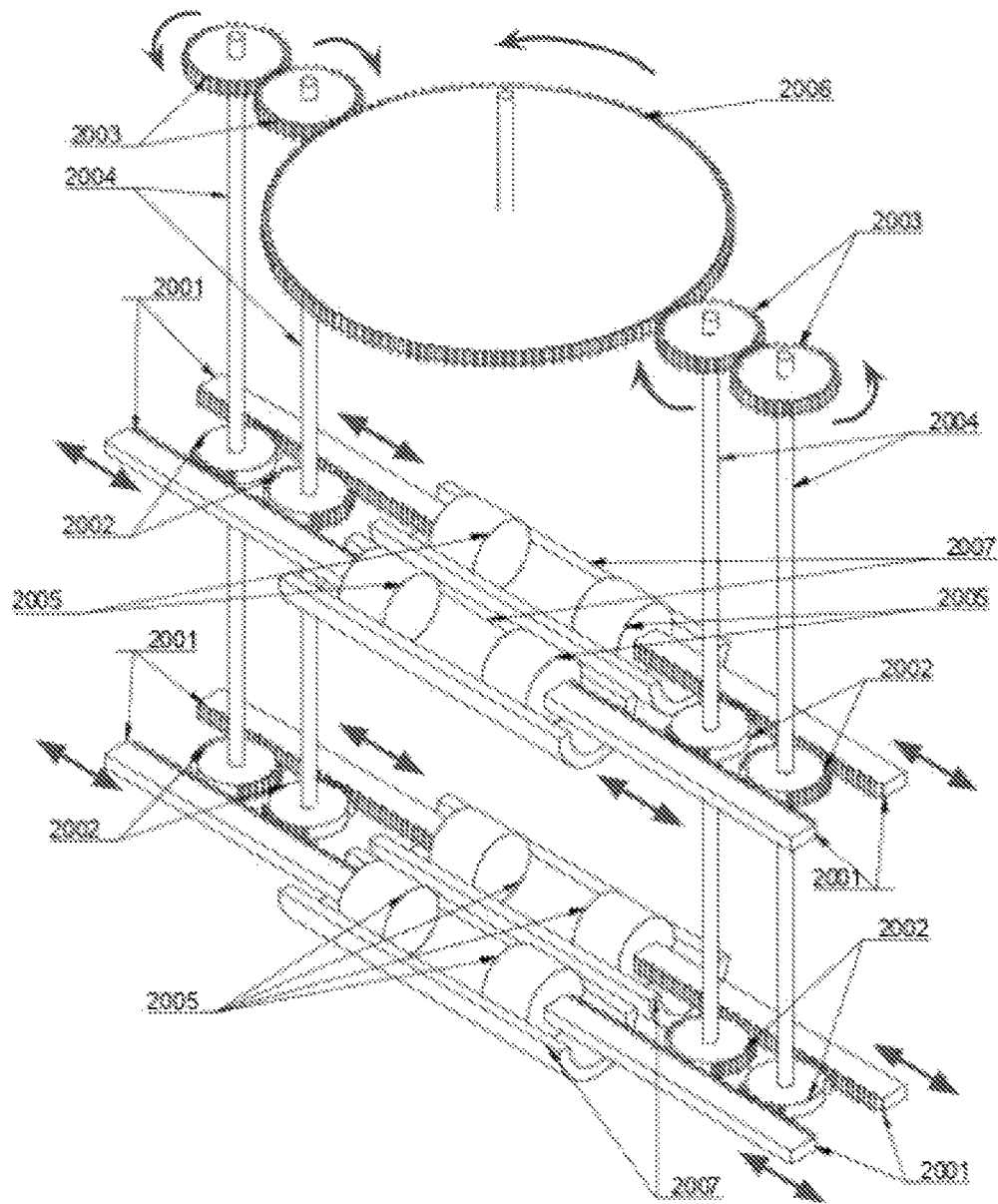
FIG. 20 shows the exemplary mechanical converter featuring two corresponding gears engaged to a shared gear, with each corresponding gear engaged to a secondary corresponding gear in opposing rotation.

FIG. 20 shows the version of the converter of reciprocating motion in rotary motion for use in a four-stroke four-cylinder ICE with opposite piston movement. The converter includes four cylinders 2007 with two pistons 2005 inside each cylinder, similar to the model presented on FIG. 17. The cylinders 2007 deployed in two pairs and parallel to each other. In each pair, one cylinder is upper and the other one is lower. The gear racks 2001 are rigidly attached to the piston 2005 centers. Similar to the converter, presented on FIG. 17, In order to simplify the design, the converter uses half-gears 2002 with two "toothed" parts, equal in length and alternating with two "toothless" parts each.

A pair of half-gears 2002 is located between racks 2001 on each side of cylinders. In each pair the half-gears 2002 are deployed with a shift 90 degrees to each other in their initial position in such a way, that when they are synchronously rotating in opposite directions, they alternately engage with corresponding pair of gear racks 2001—so only one half-gear 2002 engages with both racks 2001 at any time and never both half-gears are engaged with the gear rack simultaneously. Therefore, when they are synchronously rotating in opposite directions, they alternately engage with both racks 2001, forcing racks 2001 with pistons 2005 to perform a counter reciprocating motions.

Each shaft 2004 connects gear 2003 and two half-gears 2002, deployed without a shift to each other. Gears 2003 are engaged with each other in pairs. Gear wheel 2006 engages with one gear 2003 of each pair, ensuring synchronous rotation of pairs of gears 2003. When the engine is operated, the fuel-air mixture is ignited between pistons 2005 in all four cylinders 2007 sequentially, alternating between upper and lower cylinders 2007. An ignition in one of upper cylinders follows and ignition in one of lower cylinders and vise versa. Following the combustion of air-fuel between two pistons 2005 in any cylinder (upper or lower), pistons 2005 of two cylinders 2007 move apart and pistons 2005 of other cylinders 7200 (lower or upper correspondingly) move towards each other. When the engine operates, half-gears 2002 engage with racks 2001 and rotate with gears 2003, causing pistons 2005 and racks 2001 to make counter reciprocation motions. Due to all counter movements during the engine operation, the engine vibration is minimal.

Figure 21:
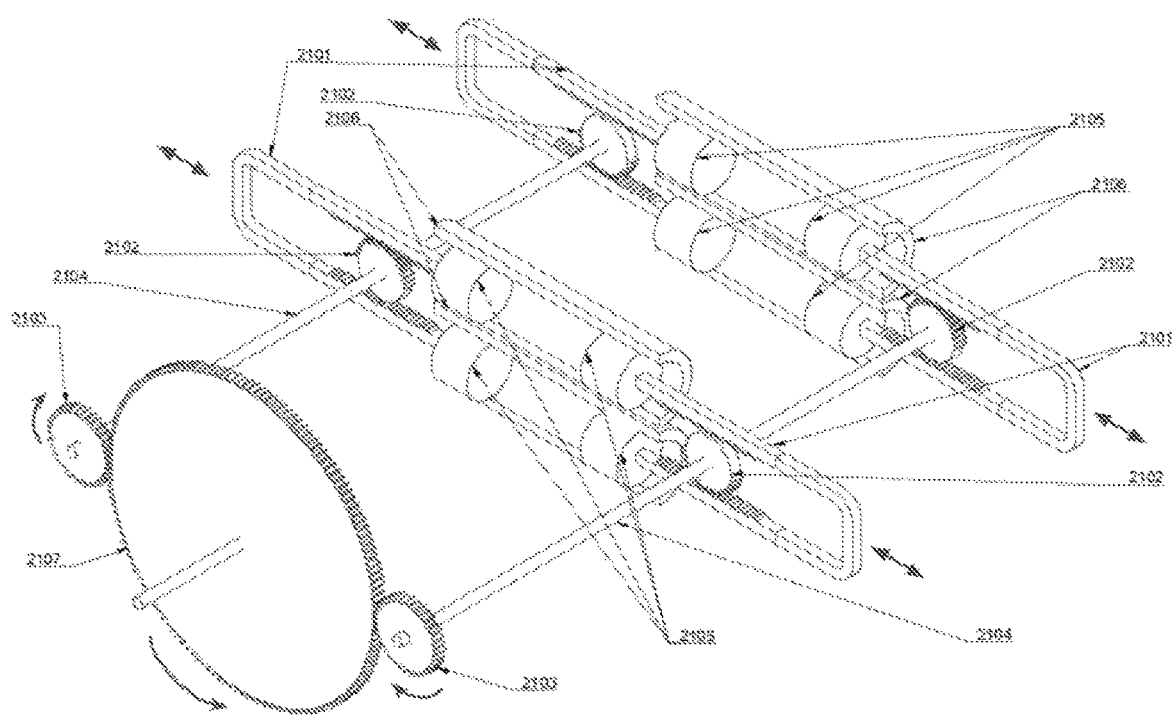
FIG. 21 shows the exemplary mechanical converter featuring two corresponding gears engaged to a shared gear and gear frames.

FIG. 21 shows the second variant of the converter of reciprocating motion into rotary motion for use in a four-stroke four-cylinder ICE with opposite piston movement. The converter includes four cylinders 2106 with two pistons 2105 inside each cylinder, four C-shaped gear racks 2101, four half-gears 2102, two gears 2103 and gear wheel 2107. The cylinders 2106 deployed in two pairs in two vertical plans and parallel to each other. In each pair of cylinders 2106, two C-shaped toothed frames 2101 are connecting the left pistons 2105, and two other C-shaped toothed frames 2101 are connecting the right pistons 2105. Each C-shaped toothed frame 2101 consists of two parallel gear racks, which ends on one side are connected to each other, and on the other side are connected to the pistons 2105.

The half-gears 2102 are located in the inner part of the C-shaped gear racks 2101. When rotating, the half-gears 2102 are alternatively engaged with two 'toothed' parts of C-shaped gear racks 2101. Two half-gears are deployed on the left to the cylinders 2106, sit on the same shaft 2104 with the gear 2103 and shifted 180 degrees to each other. Two half-gears are deployed on the right to the cylinders 2106, sit on the same shaft 2104 with the gear 2103 and shifted 180 degrees to each other. Half-gears, deployed on a different sides of the same cylinders pair are shifted 180 degrees to each other.

Both gears 2103 are engaged with gear wheel 2107, ensuring synchronous rotation of all gears 2103 and half-gears 2102.

Following the combustion of air-fuel between two pistons 2105 in any cylinder 2106, pistons 2105 of two cylinders 2107 move apart simultaneously in both of a pair of cylinders 2106, which pistons are connected with C-shaped toothed frame. This cause the half-gears 2102, engaged with the C-shaped frames to rotate. Rotating half-gears, in turn, cause counter motion of C-shaped frames connected to the pistons 2105 in the other pair of cylinders 2106.

During engine operation, the ignition of the air-fuel mixture occurs alternately between the pistons 2105 of all cylinders 2106 with the obligatory alternation of pairs of cylinders 2106 connected by C-shaped gear racks 2101.

Figure 22:
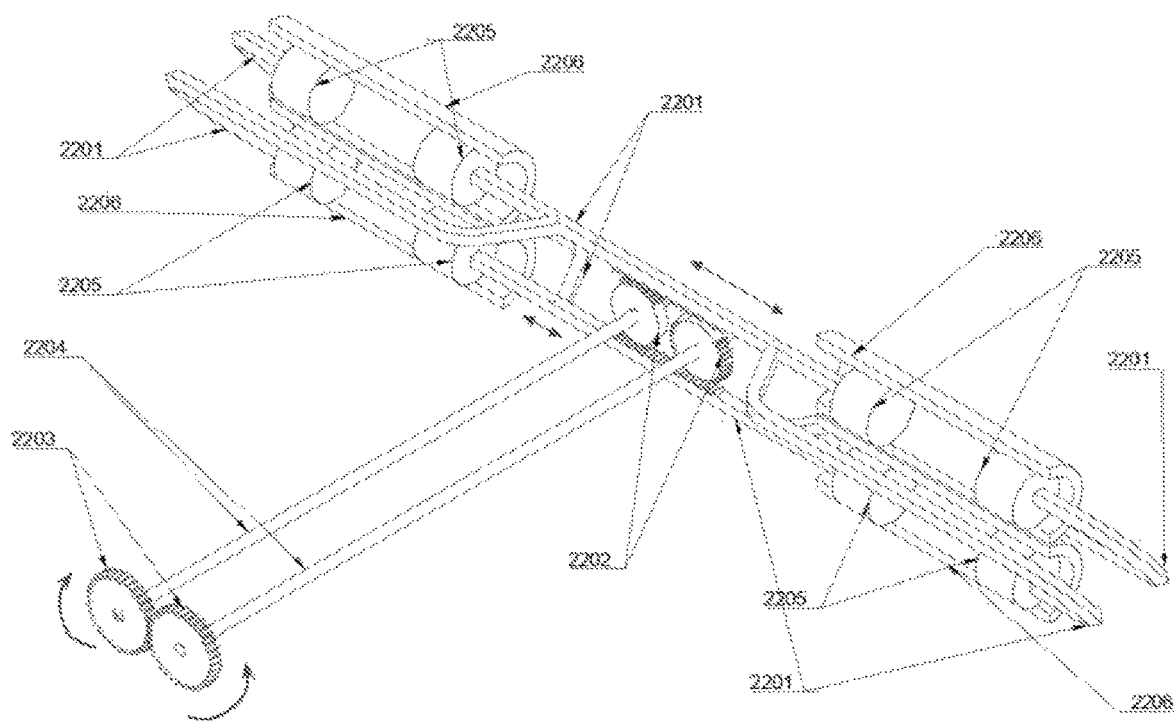
FIGS. 22-24 shows the exemplary mechanical converter with corresponding gears engaged in opposing rotation.

FIG. 22 shows the third variant of the converter of reciprocating motion into rotary motion for use in a four-stroke four-cylinder ICE with opposite piston movement. The converter includes four cylinders 2206 with two pistons 2205 inside each cylinder, four Z-shaped fractions 2207, two half-gears 2202 with two "toothed" parts, equal in length and alternating with two "toothless" parts each (similar to ones used in the converter, presented on FIG. 17), two shafts 2204, two gear racks 2201 and two gears 2203.

All cylinders 2206 are located in pairs in vertical plane one above the other. Z-shaped fractions 2207 are connecting the left piston 2205 of one cylinder with the right piston 2205 of another cylinder in each pair of cylinders.

Gear racks 2201 are connecting the right piston 2205 of the left cylinder 2206 with the left piston 2205 of the right cylinder 2206. Two half-gears 2202 are located between parallel gear racks 2201, and deployed with a shift 90 degrees to each other in their initial position in such a way, that when they are synchronously rotating in opposite directions, they alternately engage with the gear racks 2201—so only one half-gear 2202 engages with both racks 2201 at any time. Each shaft 2204 connects half-gear 2202 and gear 2203. Gears 2203 are identical and engaged with each other.

This converter works similar to the converter, presented on the FIG. 19. During engine operation, the ignition of the air-fuel mixture occurs alternately between the pistons 2205 of all cylinders 2206 with the obligatory alternation of pairs of cylinders 2206. Following the combustion sequence pistons 2205 of all cylinders 2206, Z-shaped gear frames 2201 and both gear racks 2201 are performing counter reciprocating motions, and the half-gears, engaged with them are performing counter rotational motion together with gears 2203. Due to all counter movements during the engine operation, the engine vibration is minimal.

Figure 23:
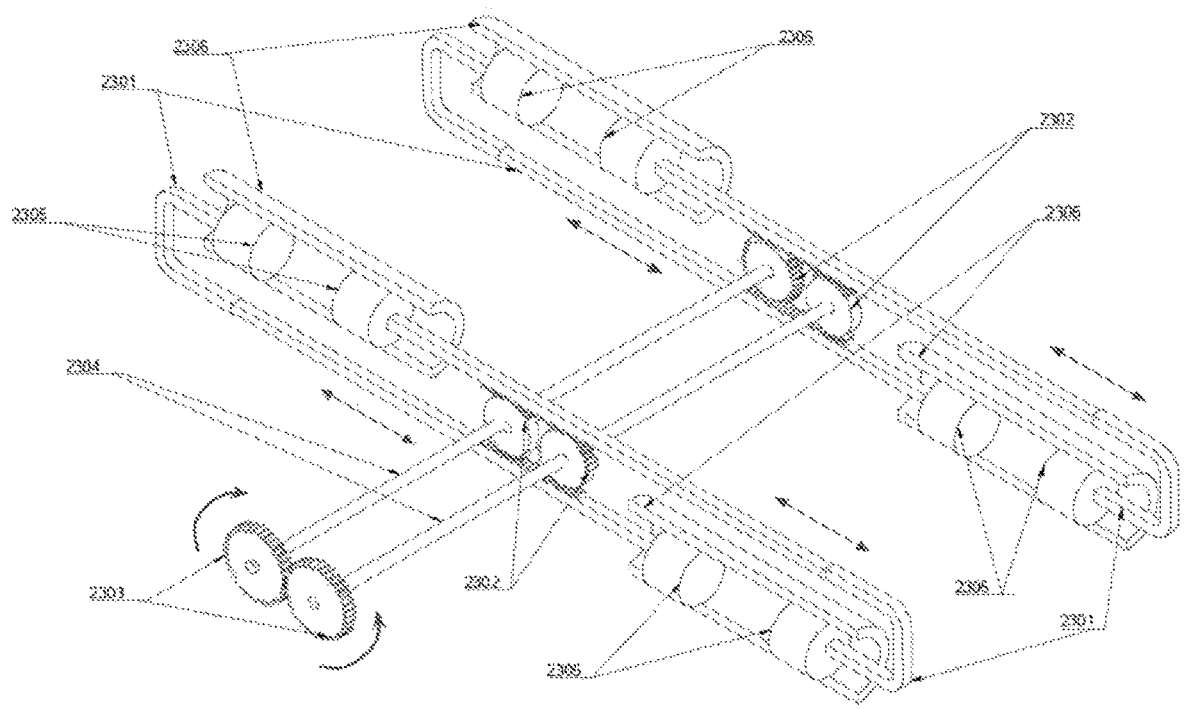

FIG. 23 shows the forth variant of the converter of reciprocating motion into rotary motion for use in a four-stroke four-cylinder ICE with opposite piston movement. The converter includes four cylinders 2306 with two pistons 2305 inside each cylinder, four C-shaped gear racks 2301, four half-gears 2302, two gears 2303. All cylinders 2306 are located in pairs in two parallel vertical planes. In each pair of cylinders 2306 of the same plane, one C-shaped toothed frame 2301 is connecting the left pistons 2305, and the other C-shaped toothed frame 2301 is connecting the right pistons 2305.

The half-gears 2302 are located in the inner part of the C-shaped gear racks 2301 between two "toothed" rectilinear sections and deployed with a shift 90 degrees to each other in their initial position in such a way, that when they are synchronously rotating in opposite directions, they alternately engage with both toothed part of the same C-shaped gear racks 2301. Two half-gears sit on the same shaft 2304 with the gear 2303 and shifted 90 degrees to each other.

Following the combustion of air-fuel between two pistons 2305 of one cylinder 2306, pistons 2305 are moving apart and via C-shaped gear racks 2301 the two pistons 2305 of another cylinder 2306 in the same pair are moving apart too. With that both C-shaped frames 2301 are moving apart, the half-gear, engaged with them is rotating, and all gears 2303 and half-gears 2302 are rotating too. In the other pair of cylinders 2306 the C-shaped frames 2301 are moving in opposite direction, as they are engaged with the half-gear 2302, which rotates in the opposite direction, so the pistons 2305 of both cylinders 2306 are moving toward each other. During engine operation, the ignition of the air-fuel mixture occurs alternately between the pistons 2305 of all cylinders 2306 with the obligatory alternation of pairs of cylinders 2306. All C-shaped gear racks 2301 with the pistons 2305 are performing the counter reciprocating motions, and the half-gears, engaged with them are performing rotational motion together with gears 2303. Due to all counter movements during the engine operation, the engine vibration is minimal.

Figure 24:
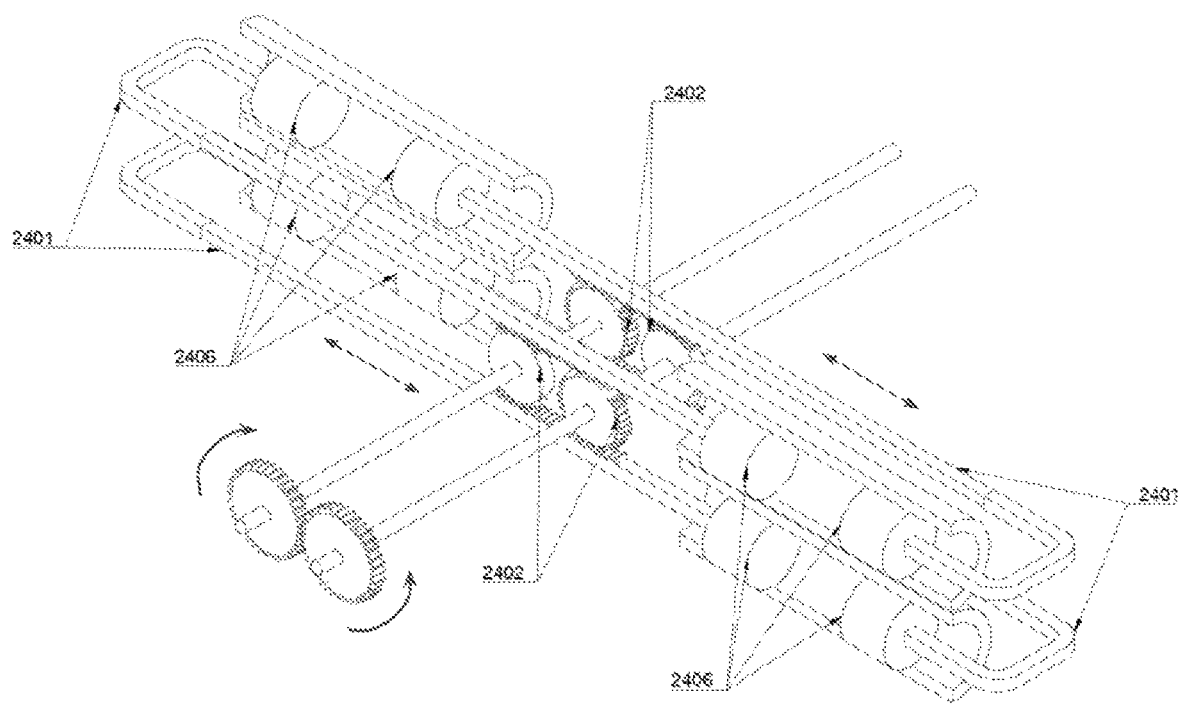

FIG. 24 shows the fifth variant of the converter of reciprocating motion into rotary motion for use in a four-stroke four-cylinder ICE with opposite piston movement. This converter is built and works similar to the converter, presented on FIG. 23. The difference is that all cylinders 2406 are deployed in pairs in two horizontal planes. With that one pair of half-gears 2402 is engaged with C-shaped gear racks 2401, connecting right pistons of the cylinders 2406, and the other pair of half-gears 2402 is engaged with the C-shaped gear racks 2401, connecting left pistons of the cylinders 2406. The converters, presented on FIG. 23 and FIG. 24 are equivalent.

Figure 25:
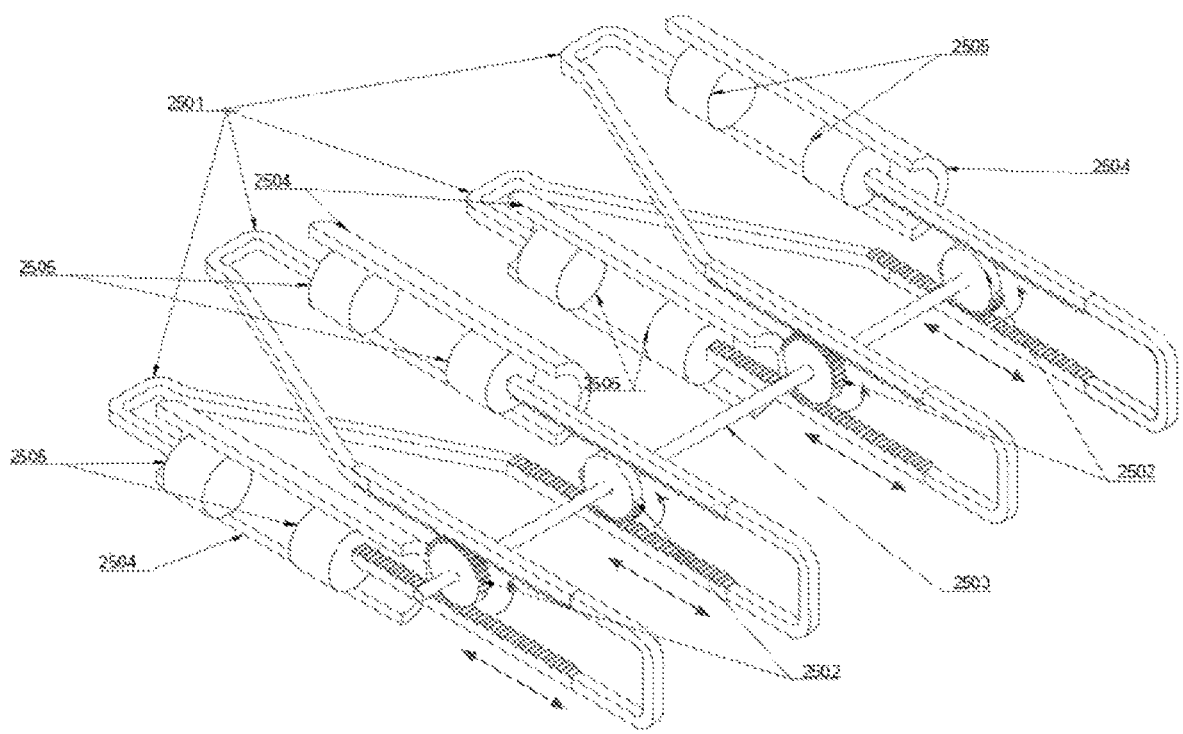
FIG. 25 shows the exemplary mechanical converter with a gear frame, the gear frame being Z-shaped.

FIG. 25 shows the sixth variant of the converter of reciprocating motion into rotary motion for use in a four-stroke four-cylinder ICE with opposite piston movement. The converter comprises four cylinders 2504 with two pistons 2505 inside each cylinder, four Z-shaped gear frames 2501, one shaft 2503, and four gears 2502. All four cylinders 2504 are deployed parallel to each other and grouped in two pairs of cylinders 2504, connected with the Z-shaped gear frame 2501. In fact, this converter is structurally composed of two converters, presented on FIG. 19, using the common shaft 2503. When the engine is operated, the fuel-air mixture is ignited alternatively between pistons 2505 in all cylinders 2504. Following the combustion all pistons 2505 and Z-shaped gear frames 2501 counter reciprocate, alternatively engaging with half-gears 2502, causing them to rotate. Due to all counter movements during the engine operation, the engine vibration is minimal.

When a converter, using gear racks and half-gears, is applied in ICE or other mechanisms, a vibration may occur, which can force racks to turn around its axis. Such turn can cause coupled racks and half-gears to disengage. Therefore, it is necessary to take measures to eliminate the possibility of rotation of the gear racks around its axis, or to provide adhesion between the gear rack and the half-gear, which does not depend on the angle of rotation of the gear rack around its axis.

In ICE's an efficient fuel-air mixture combustion and gas emission processes occur under a certain high pressure inside the cylinder and lasts a certain amount of time about 1 millisecond. If a piston, immediately, after the combustion initiation, will start moving off its highest dead point, this may cause a sharp drop of gas pressure, which can cause an incomplete fuel-air combustion and reduce the engine efficiency. Therefore, in order to ensure a full combustion of a fuel-air mixture and to keep the engine efficiency, it is it is necessary to hold the piston during the process of fuel combustion and the formation of gas pressure and ensure its immobility. A piston and rack delay exists in all presented converter variants. Delay is formed during the transient when the rack and piston change their direction of movement.

In converters, containing a gear rack and two half-gears, alternatively engaging with it, when the rack changes its direction, both half-gears continue their rotation. In this case, the top of the first tooth of the half-gear sliding along the surface of the teeth of the gear rack, which engages with the gear rack, and the tip of the last tooth of the half-gear, sliding out of engagement with the gear rack. During this slide, the piston and rack cannot move.

The holding time of the piston in a stationary state depends on the width of the first and last teeth of the toothed part of the half-gears and on the rotation speed of the half-gears. Since for each internal combustion engine there is a specific optimal rotation speed of the half-gears to obtain maximum efficiency or torque, then at the optimal rotation speed of the half-gears, the delay time depends only on the width of the first and last teeth of the toothed part of the half-gears.

Similarly, in converters, containing gear frame with a half-gear, rotating inside it, such delay also exists when the gear frame with the piston changes its moving direction. In this case the half-gear moves from a disengagement with one side of the gear frame to an engagement with another side of the gear frame, so the top of the first and the last teeth of the rotating half-gear are sliding on the surface of the teeth of the both sides of the gear frame.

Roughly the width of the first and last teeth should correspond to 10-degree rotation of a half-gear at a half-gear rotation speed of 2000 rpm. The optimum width of these teeth should be selected separately for each type of engine and for each type of fuel. In gear converters of reciprocating motion into rotary motion, containing half-gears and gear racks, half-gears can be used not only with one toothed part, but also with any number n (1 or more) of toothed parts while maintaining the lengths of the toothed and non-toothed parts equal to the length of the gear rack travel in one direction. In this case, the diameters of the half-gears increase n times, the rotation speed of the gears and half-gears decreases n times, the torque acting on the half-gears of the converter increases n times. The shift between half-gears, which alternately engage with the gear rack and are on one side of it, should be equal to 180/n degrees in their start position, and the shift between half-gears which alternately engage with the gear rack and are located on both sides of it, should be equal to 0 degrees. In addition, an increase in the number of toothed parts of the half-gear leads to a decrease in the load on each tooth of the half-gear and, consequently, to an increase in the reliability of the half-gear.

Figure 26:
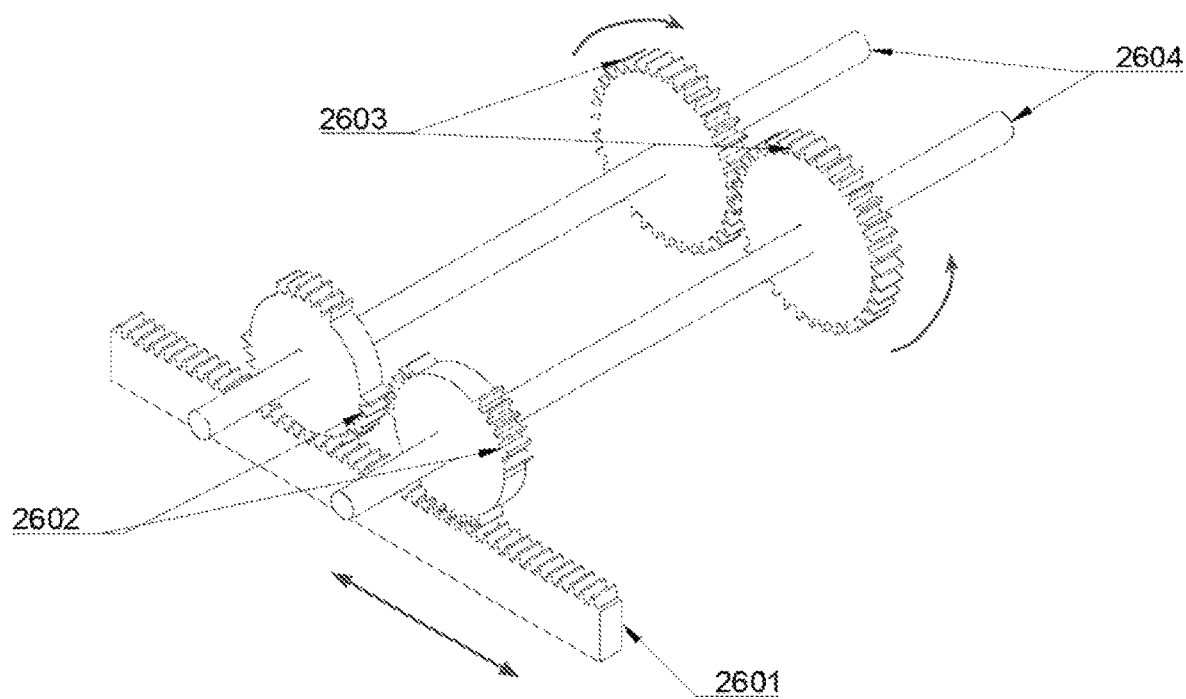
FIGS. 26-27 shows the exemplary mechanical converter with corresponding gears engaged in opposing rotation.

FIG. 26 shows an example of the converter of reciprocating motion into rotary motion with the use of half-gears with three toothed parts. The converter consists of geared rack 2601, two half-gears 2602 with three toothed parts each, two gears 2603, two shafts 2604. Half-gears 2602 are deployed with a shift 60 degrees to each other in their initial position in such a way, that when they are synchronously rotating in opposite directions, they alternately engage with the gear racks 2601—so only one half-gear 2602 engages with gear rack 2601 at any time, forcing rack 2601 to reciprocate.

This converter operates in analogy to converter on FIG. 1. The difference is, that in this converter, the diameter of half-gears 2602 and the torque effect applied to half-gears 2602 is increased three times, the rotation speed of half-gears 2 is decreased three times, because now they are making one full turn while the rack 2601 is doing movements forward and back three times. Similarly, in converters containing half gears with two gear parts, half gears with any even number of gear parts can be used.

Figure 27:
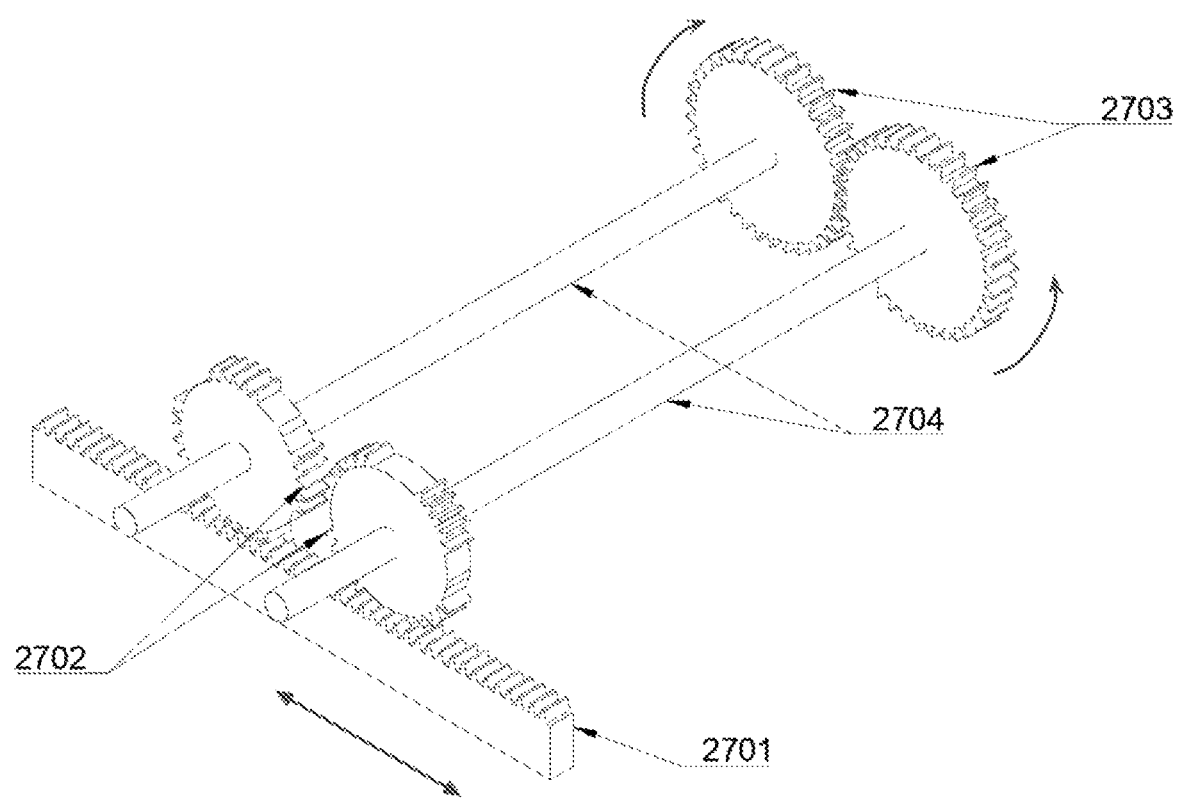

FIG. 27 shows an example of the converter of reciprocating motion into rotary motion with half-gears having four toothed parts for use in a four-stroke four-cylinder opposed-piston ICE engine. The engine consists of two gear racks 2701, two half-gears 2702 with four toothed parts each, two gear wheels 2703 and two shafts 2704. Half-gears 2702, which are deployed with a shift 45 degrees to each other in their initial position in such a way, that when they are synchronously rotating in opposite directions, they alternately engage with the gear racks 2701, forcing racks 2701 to reciprocate.

This converter works similar to the converter, described on FIG. 14. The difference is that in this converter, the diameter of half-gears 2702 is increased two times, the torque is two times higher and the rotation speed of half-gears 2702 is two times lower, because they are making one full rotation cycle while the rack 2701 is doing four full reciprocating cycles.

Similarly, in converters, containing gear frames and half gears, half gears with any odd number of gear parts can be used. As can be seen from the above, the proposed variants and examples of the design of geared converter of reciprocating motion into rotary motion for the use in ICEs have the following advantages, comparing to current ICEs, using crank mechanism: lower vibration, higher reliability due to the absence of the piston skewing, when moving inside the cylinder, the simplicity of design and parts, lower mass of the engine, simplification of manufacturing and repair process due to the absence of massive and expensive crankshaft, simplification of the piston design (no need in the piston skirt and piston-pin boss).

The proposed converters have approximately 1.5 times higher efficiency, comparing to current ICEs, which accordingly contributes to fuel saving, regardless engine fuel type as well to reduction of the harmful effect on the environment when engine is operated. The higher efficiency of the engine allows to reduce the engine cooling requirements due to reduction of energy loss, caused by engine warming, also reduce starter and accumulator battery power requirements, and as a result their weight and size. Moreover, the engines, based on the proposed converters, are much easier to scale than the engines, based on current crank mechanisms, because, there is no need in scaling the complex crankshaft. Depending on load, It is enough to connect or disconnect an additional engine blocks serially or in parallel using gear train.

The invention claimed is:

1. A mechanical converter comprising a first shared gear, a first and second half-gear, a first and second shaft, and a first and second corresponding gear,
    a. the first shaft fixed to the first half-gear and the first corresponding gear, the second shaft being fixed to the second half-gear and the second corresponding gear;
    b. the first and second half-gears having a toothed section covering a portion of a circumference each;
    c. the first and second half-gears being configured to rotate synchronously and in alternately toothed engagement with the first shared gear so that only one of the first and second half-gears is engaged with the first shared gear at a time; and
    d. the first shared gear configured to produce reciprocating motion in response to the alternate engagement with the first and second half-gears;
    e. the first corresponding gear being directly toothedly engaged with the second corresponding gear.

2. The mechanical converter of claim 1, the first shared gear being a gear rack.

3. The mechanical converter of claim 1, the mechanical converter comprising a second shared gear, a third half-gear, and a fourth half-gear, a. the third half-gear being fixed to the first shaft and the fourth half-gear being fixed to the second shaft, and
b. the third and fourth half-gears being configured to rotate synchronously and in alternately toothed engagement with the second shared gear so that only one of the third and fourth half-gears is engaged with the second shared gear at a time.

4. A mechanical converter comprising a first and second gear rack, a gear wheel, a first and second half-gear, a third and fourth half-gear, a first and second shaft, and a first and second corresponding gear,
a. the first shaft fixed to the first half-gear, the third half-gear, and the first corresponding gear, the second shaft being fixed to the second half-gear, the fourth half-gear, and the second corresponding gear;
b. the first, second, third, and fourth half-gears each having a toothed section covering a portion of a circumference each;
c. the gear wheal being toothedly engaged to the first and second corresponding gears;
d. the first, second, third, and fourth half-gears each being configured to rotate synchronously, in the same direction of rotation, and in alternately toothed engagement with the gear rack so that only one of the first and second half-gears is engaged with the first gear rack at a time and only one of the third and fourth half-gears is engaged with the second gear rack at a time;
e. the first gear rack disposed between the first and second half-gears and configured to produce reciprocating motion in response to the alternate engagement with the first and second half-gears; and
f. the second gear rack disposed between the third and fourth half-gears and configured to produce reciprocating motion in response to the alternate engagement with the third and fourth half-gears;
with the first and second gear rack oriented to operate in parallel.

5. The mechanical converter of claim 3, the first and second shared gears each being gear racks.

6. The mechanical converter of claim 2, the first shared gear having a piston disposed on at least one end.

7. The mechanical converter of claim 2, the first shared gear having pistons disposed on opposite ends of the first shared gear.

8. The mechanical converter of claim 5, the first and second shared gears each having pistons disposed on at least one end of each, with the first and second shared gears being in reverse reciprocating motion with respect to each other.

9. The mechanical converter of claim 5, the first and second shared gears each having pistons disposed on opposite ends of each, with the first and second shared gears being in reverse reciprocating motion with respect to each other.

10. The mechanical converter of claim 1, the first shared gear being disposed between the first and second half-gears.

11. The mechanical converter of claim 3, the first shared gear being disposed between the first and second half-gears, the second shared gear being disposed between the third and fourth half-gears.

12. The mechanical converter of claim 5, the first and second shared gears being in parallel.

13. The mechanical converter of claim 3, the first and second corresponding gears and the first, second, third, and fourth half-gears having the same directionality of rotation.

14. The mechanical converter of claim 2, the first shared gear having two sides, with each side being toothed, and the first half-gear being toothedly engaged to a first side and the second half-gear being toothedly engaged to a second side.

15. The mechanical converter of claim 5, with each of the first and second shared gears having two sides, with each side being toothed, and the first half-gear being toothedly engaged to a first side of the first shared gear, the second half-gear being toothedly engaged to a second side of the first shared gear, the third half-gear being toothedly engaged to a first side of the second shared gear, and the fourth half-gear being toothedly engaged to a second side of the second shared gear.

16. The mechanical converter of claim 3, additionally comprising a third shared gear, the third shared gear being toothedly engaged to at least one of the first and second corresponding gears.

17. A mechanical converter comprising a first shared gear rack, a second shared gear rack, a shared gear wheel, a first, second, third, and fourth half-gear, a first and second shaft, and a first and second corresponding gear,
a. the first shaft fixed to the first half-gear, the third half-gear, and the first corresponding gear, the second shaft being fixed to the second half-gear, the fourth half-gear, and the second corresponding gear;
b. the first, second, third, and fourth half-gears having a toothed section covering a portion of a circumference each;
c. the first and second half-gears being configured to rotate synchronously and in alternately toothed engagement with the first shared gear rack so that only one of the first and second half-gears is engaged with the first shared gear rack at a time;
d. the third and fourth half-gears being configured to rotate synchronously and in alternately toothed engagement with the second shared gear rack so that only one of the third and fourth half-gears is engaged with the first shared gear rack at a time;
e. the first and second corresponding gears being configured to rotated synchronously with the shared gear wheel; and
f. the first shared gear configured to produce reciprocating motion in response to the alternate engagement with the first and second half-gears, the second shared gear configured to producing reciprocating motion in response to the alternate engagement with the third and fourth half-gears.

* * * * *